United States Patent [19]

Murai et al.

[11] Patent Number: 5,724,117
[45] Date of Patent: Mar. 3, 1998

[54] SPECTACLES WITH DECORATION

[75] Inventors: Masaru Murai; Takayuki Hirai; Isao Hyoi; Yoshimi Maeda, all of Fukui; Seiichi Susuki, Fukui Prefecture, all of Japan

[73] Assignee: Murai Co., Ltd., Fukui, Japan

[21] Appl. No.: 430,739

[22] Filed: Apr. 28, 1995

Related U.S. Application Data

[62] Division of Ser. No. 956,950, Oct. 5, 1992, Pat. No. 5,469,230.

[30] Foreign Application Priority Data

| Dec. 12, 1991 | [JP] | Japan | 3-109469 |
| Dec. 12, 1991 | [JP] | Japan | 3-109470 |
| Dec. 19, 1991 | [JP] | Japan | 3-110862 |
| Feb. 21, 1992 | [JP] | Japan | 4-17195 |
| May 21, 1992 | [JP] | Japan | 4-40290 |
| May 22, 1992 | [JP] | Japan | 4-41159 |
| May 22, 1992 | [JP] | Japan | 4-41161 |
| May 25, 1992 | [JP] | Japan | 4-41868 |
| May 25, 1992 | [JP] | Japan | 4-41869 |

[51] Int. Cl.⁶ .................................. G02C 11/02
[52] U.S. Cl. .................................. 351/52; 351/104
[58] Field of Search .................. 351/51, 52, 103, 351/104, 107; D16/102, 103, 104, 116, 123, 128, 129

[56] References Cited

U.S. PATENT DOCUMENTS

| 2,512,011 | 6/1950 | Crane | 16/116 |
| 2,516,549 | 7/1950 | Clappell | 351/103 |
| 2,554,386 | 5/1951 | Rohrback | 351/103 |
| 2,811,896 | 11/1957 | Lindblom | 351/103 |
| 4,620,778 | 11/1986 | Bertolli | 351/51 |
| 4,968,128 | 11/1990 | Mendola | 351/52 |

FOREIGN PATENT DOCUMENTS

| 1175458 | 4/1959 | European Pat. Off. . |
| 0038093 | 3/1981 | European Pat. Off. . |
| 0371904 | 11/1989 | European Pat. Off. . |
| 0371904 | 6/1990 | European Pat. Off. . |
| 0456381 | 11/1991 | European Pat. Off. . |
| 2580824 | 4/1985 | France . |
| 0407256 | 3/1933 | United Kingdom . |
| 0727003 | 9/1953 | United Kingdom . |
| 0778631 | 10/1955 | United Kingdom . |
| 0812880 | 8/1957 | United Kingdom . |
| 0872339 | 3/1959 | United Kingdom . |
| 0969408 | 8/1962 | United Kingdom . |
| 1045001 | 1/1965 | United Kingdom . |
| 1232413 | 1/1968 | United Kingdom . |
| 2102150 | 1/1993 | United Kingdom . |

Primary Examiner—David C. Nelms
Assistant Examiner—Thomas Robbins
Attorney, Agent, or Firm—Armstrong, Westerman, Hattori, McLeland & Naughton

[57] ABSTRACT

A pair of rimless type spectacles having a flexible lens holding member such as a nylon wire for holding lenses arranged in such a manner that a decoration is fastened to the lens holding member so that the decoration is fastened to the periphery of the lens so as to freely design the spectacles. It is preferable that the position at which the decoration is fastened can be adjusted and the decoration can be changed for another one.

6 Claims, 40 Drawing Sheets

FIG. 10(A)
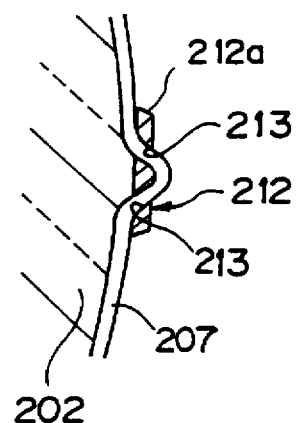
FIG. 10(B)
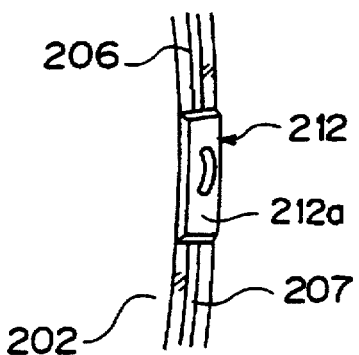
FIG. 10(C)  FIG. 10(D)  FIG. 10(E)
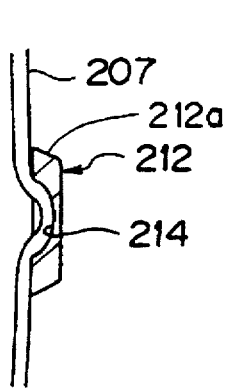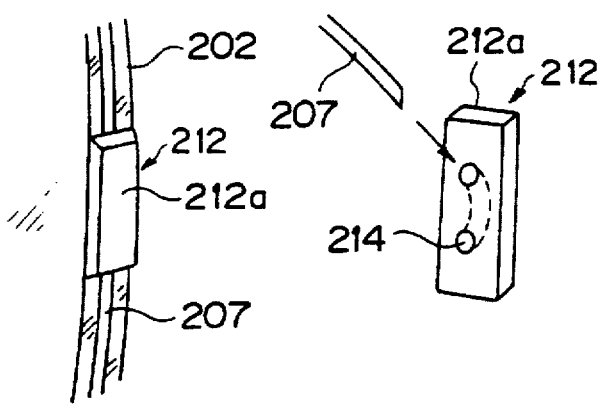
FIG. 10(F)
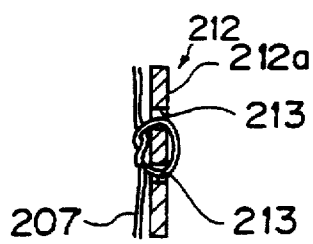

FIG. 11(A)  FIG. 11(B)
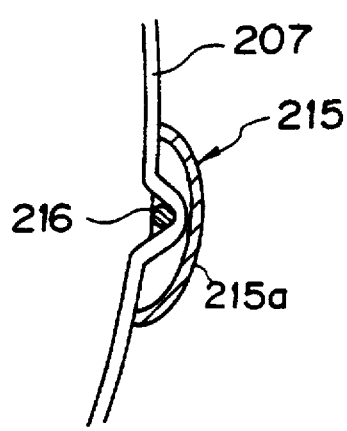
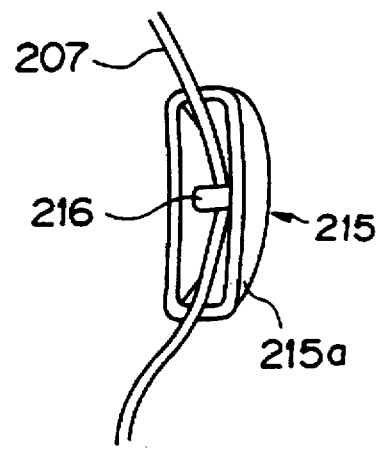
FIG. 11(C)  FIG. 11(D)  FIG. 11(E)
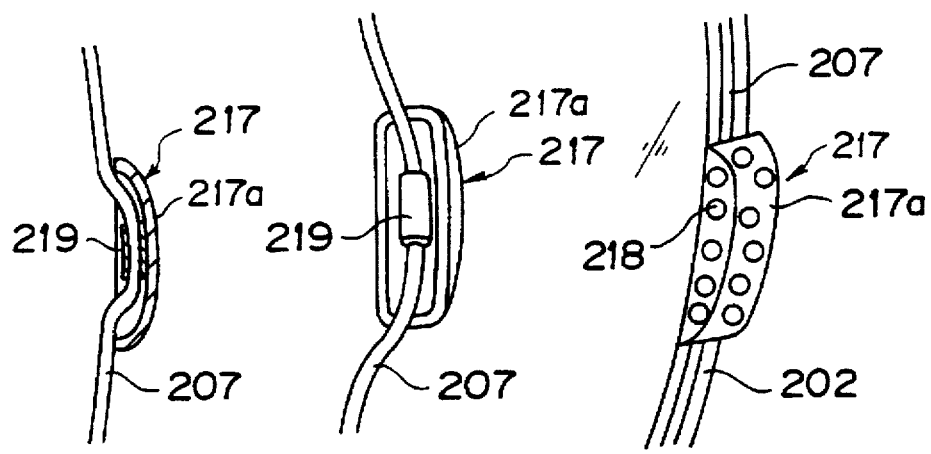
FIG. 11(F)
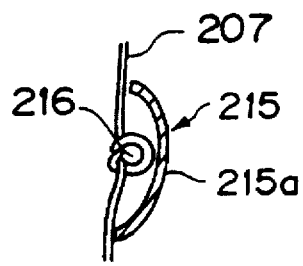

FIG. 17
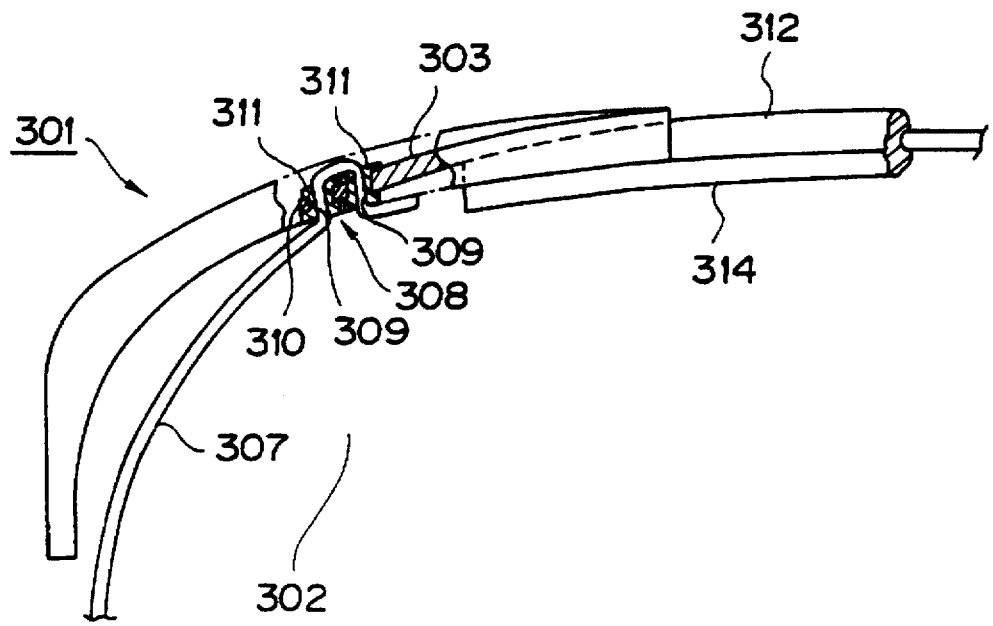
FIG. 18(A)
FIG. 18(B)
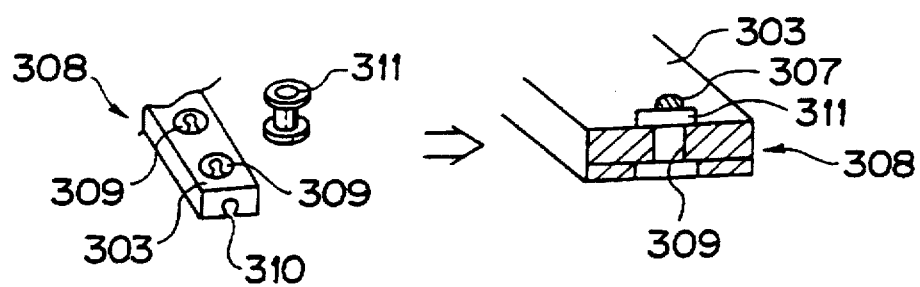
FIG. 18(C)
FIG. 18(D)
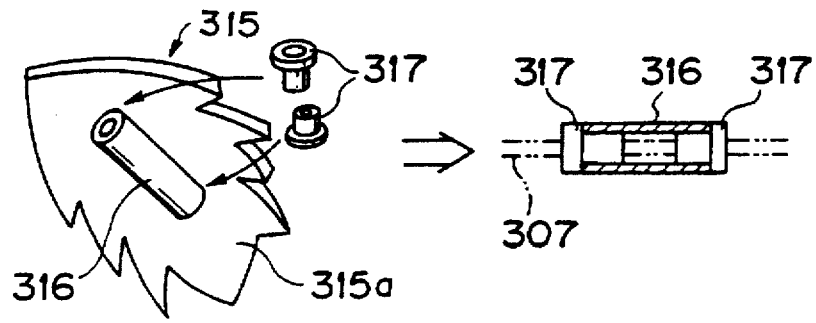

FIG. 21(A)
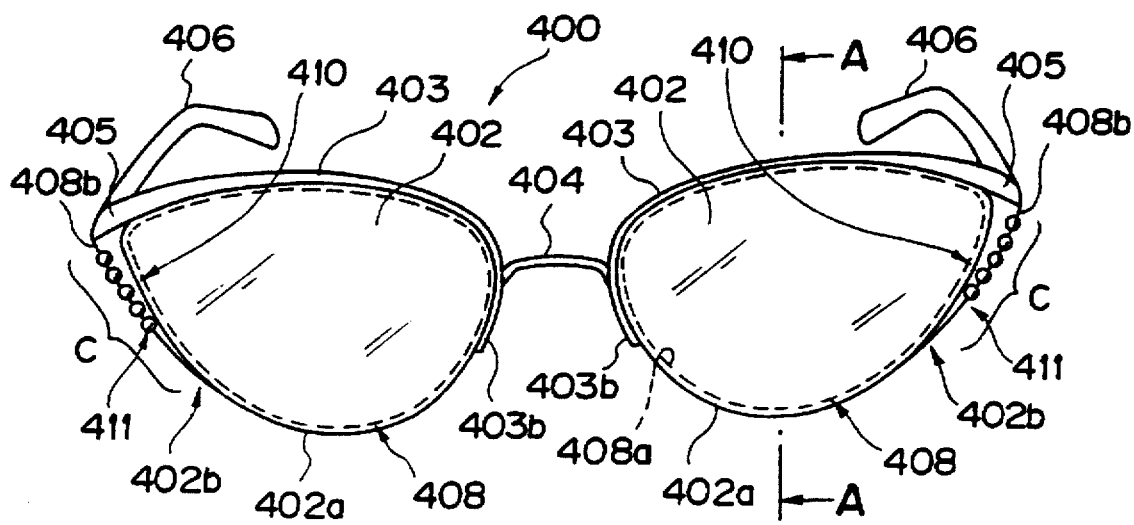
FIG. 21(B)
FIG. 21(C)
FIG. 21(D)
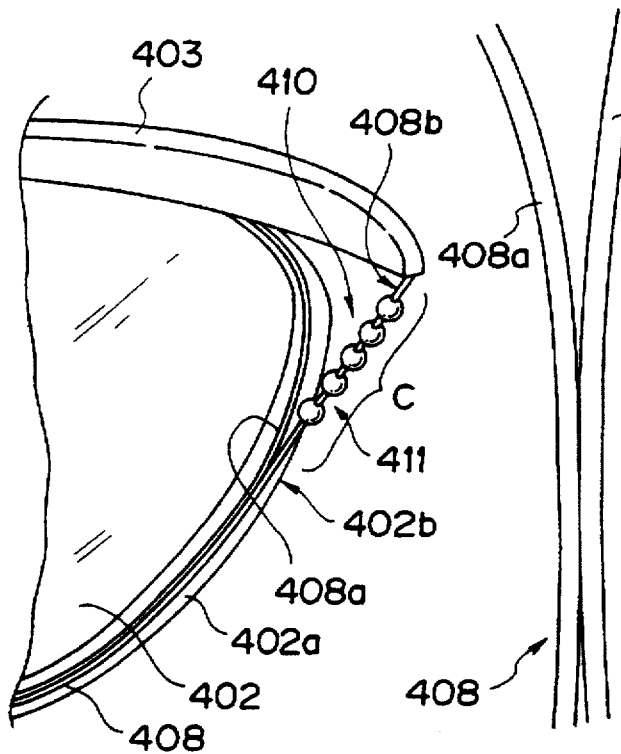
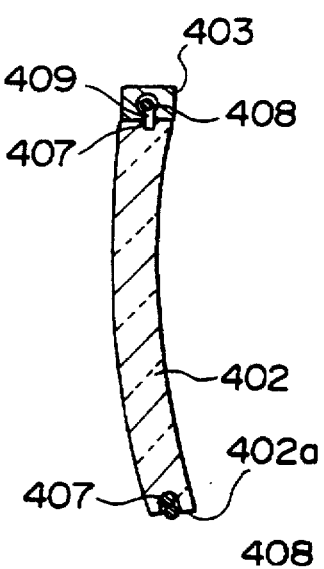

F I G. 26(A)　　F I G. 26(B)
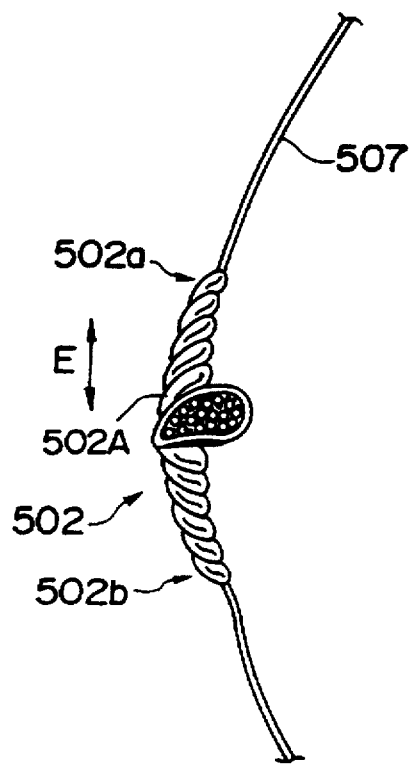
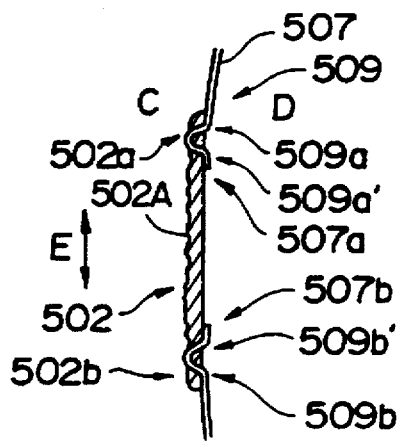
F I G. 26(C)
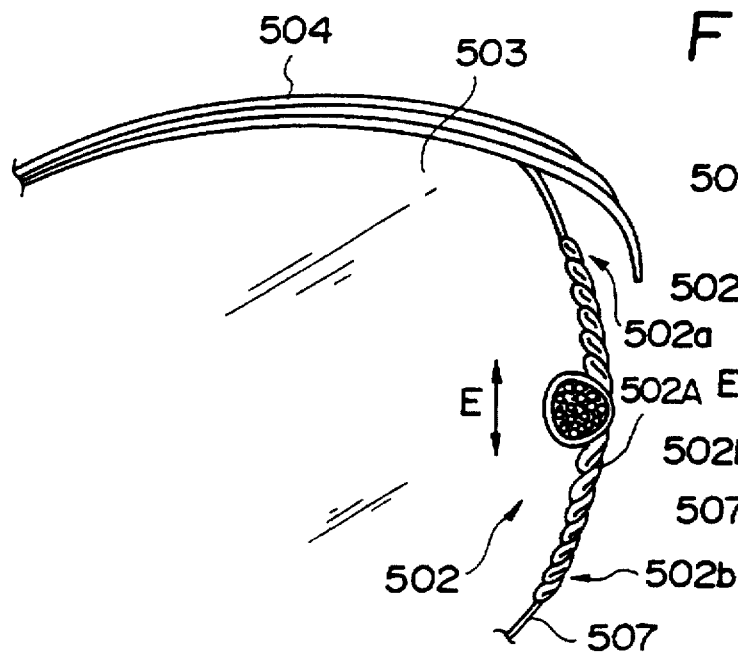
F I G. 26(D)
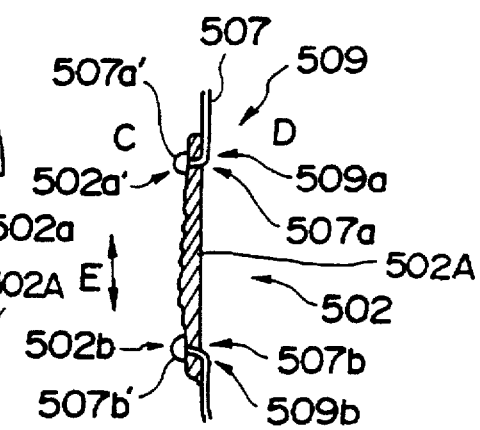

F I G. 30 (A)
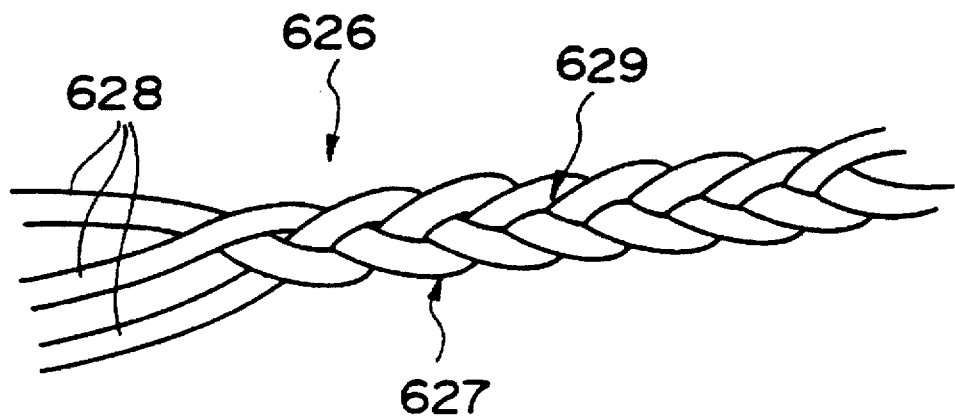
F I G. 30 (B)
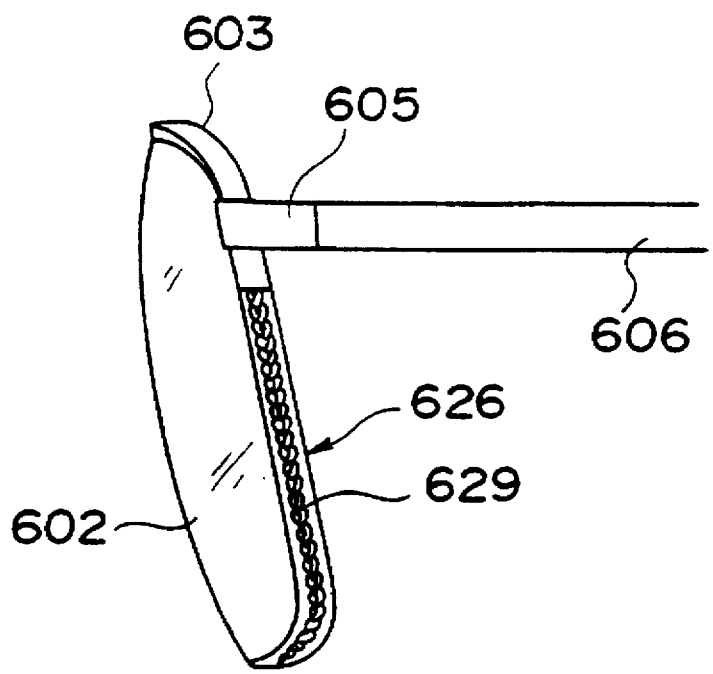

F I G. 32
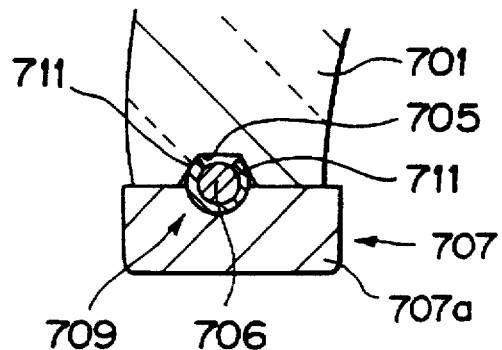
F I G. 33 (A)
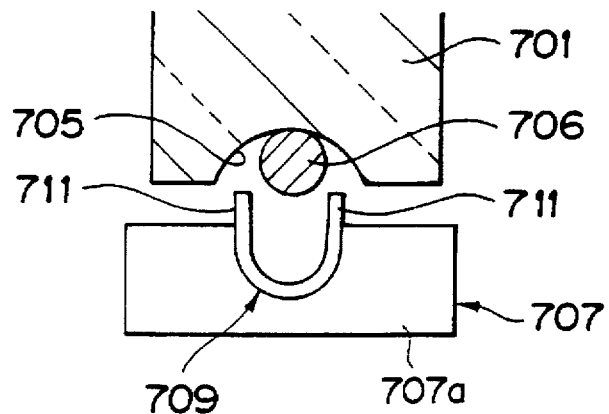
F I G. 33 (B)
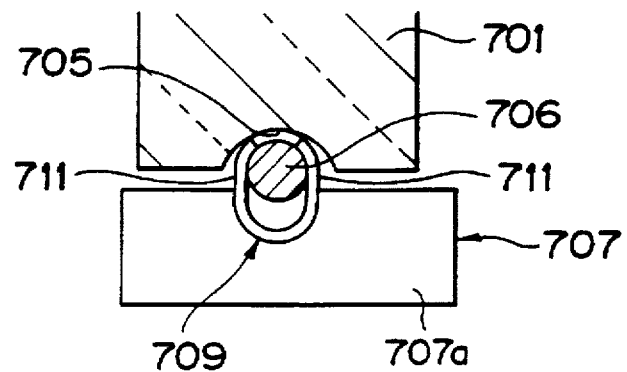

FIG. 40(A)
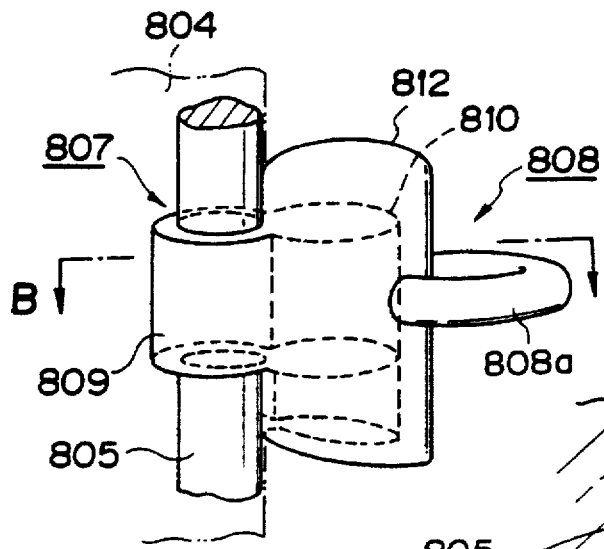
FIG. 40(B)
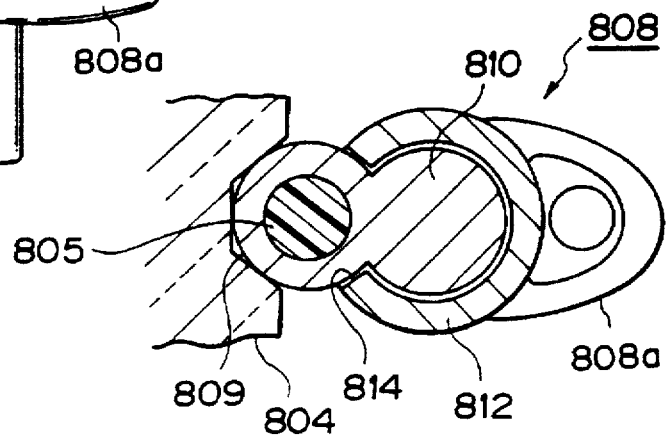
FIG. 40(C)
FIG. 40(D)
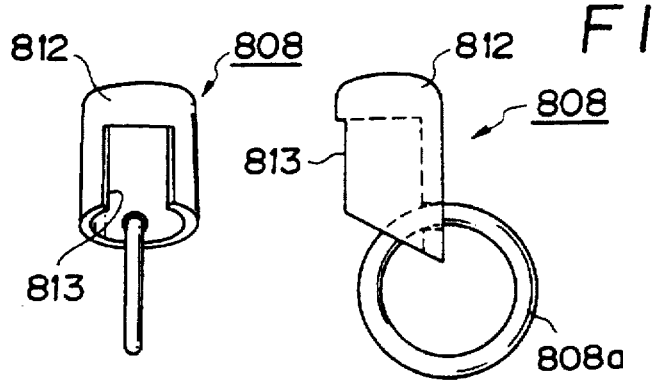
FIG. 40(E)
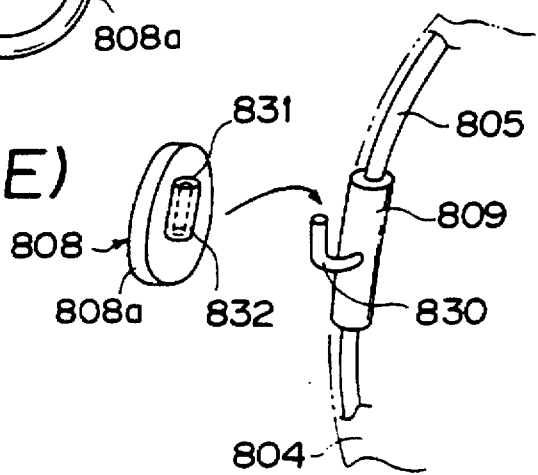

SPECTACLES WITH DECORATION

This is a divisional application of application Ser. No. 07/956,950, filed Oct. 5, 1992, now U.S. Pat. No. 5,469,230, and relates to rimless-frame type spectacles.

BACKGROUND OF THE INVENTION

The present invention relates to rimless-frame type spectacles having a flexible lens holding member such as a nylon wire for holding lenses, and, more particularly, to a structure for fitting decorations to spectacles of the type described above.

The conventional spectacles of the aforesaid type is arranged in such a manner that the top end portions of the lenses are secured to a right lens frame and a flexible lens holding member such as a nylon wire is arranged along the lower half portions of the lenses so as to secure the lenses to the lens frame by virtue of the tension of the lens holding member.

Since the spectacles of the aforesaid type does not have a rigid lens frame around the lenses, the structure can be simplified, the overall weight can be reduced and satisfactorily simple design can be realized.

Hitherto, the quality of the appearance of spectacles has been improved by fastening decorations in such a manner that screws or fastening members are ordinarily used to fasten the decorations to a rigid lens frame.

In the case where the decorations are fastened to the aforesaid rimless type spectacles, the positions at which the decorations are fastened are limited to the lens frame, causing a limitation in terms of design to take place.

SUMMARY OF THE INVENTION

An object of the present invention is to provide a pair of rimless frame type spectacles having a flexible lens holding member for holding lenses, which is capable of overcoming the aforesaid problem experienced with the conventional technology, and in which decorations can be fastened to the peripheries of the lenses along which the lens holding member is arranged so that the design of a pair of spectacles can be arranged more freely.

Another object of the present invention is to enable decorations to be fastened to arbitrary positions.

Another object of the present invention is to enable decorations to be changed.

In order to achieve the aforesaid objects, the present invention is characterized by spectacles with a decoration, comprising: a pair of lenses; spectacle frame bodies; flexible lens holding members arranged around said lenses for holding said lenses within said spectacle frame bodies; wherein a decoration is fastened to said flexible lens holding member.

Another aspect is characterized in that the decoration is fastened so as to be enabled to adjust its position quite freely. Another aspect is characterized in that the decoration can be exchanged together with said flexible lens holding member.

Another aspect is characterized in that the decoration can be exchanged independently from said flexible lens holding member.

Another aspect is characterized in that the decoration is able to be fixed to a predetermined position.

Another aspect is characterized in that the decoration is fitted to said flexible lens holding member by means of press fixing adhesion, welding or weaving.

Another aspect is characterized in that the decoration can be fixed to predetermined position and be exchanged together with said flexible lens holding member.

Another aspect is characterized in that the decoration can be fixed to predetermined position and be exchanged independently from said flexible lens holding member.

Another aspect is characterized in that the decoration has fitting means for being fitted to said flexible lens holding member.

Another aspect is characterized in that the decoration is fitted to the flexible lens holding member by its fastening hole through which said lens holding member is inserted.

Another aspect is characterized in that the decoration is fitted to said flexible lens holding member by its fastening pipe through which said flexible lens holding member is inserted.

Another aspect is characterized in that the decoration is fitted by its fastening piece or bar which is engaged with said flexible lens holding member.

It is preferable that means for reinforcing holding force is provided for partially bending said flexible lens holding member, and causing a component force of said flexible lens holding member to act on a portion with which said bent portion comes in contact so as to enlarge friction holding force of said decoration.

A protection member for protecting said flexible lens holding member is disposed between said flexible lens holding member and said fastening hole, or said fastening pipe or said fastening piece.

It is preferable that a protection member for protecting said lens holding member is disposed at a portion with which said bent portion of said flexible lens holding member comes in contact.

It is preferable that a protection member is a soft material having a large friction coefficient.

Another aspect is characterized in that the decorations are fastened to said flexible lens holding member via a support member. The decorations are fastened to said flexible lens holding member via a support member and said decoration is fixed to said flexible holding member by press fixing, adhesion, welding, braiding or tying in such a manner that said decoration cannot be moved with respect to said flexible lens holding member.

The decoration is detachably connected by fitting, screw fixing or bayonet fixing.

It is preferable that the flexible lens holding member is a fiber thread such as nylon fiber or is made of a metal wire. Another aspect is characterized in that the decoration is fastened to an end portion of the flexible lens holding member which is to be secured to the spectacle frame body.

Another aspect is characterized in that the end portion of said flexible lens holding member is covered by the decoration.

Another aspect is characterized in that the end portion of said flexible lens holding member is secured to the spectacle frame body through the decoration.

Another aspect is characterized in that a decorative wire assembly is further formed by the decoration and the flexible lens holding member.

Another aspect is characterized in that the decorative wire assembly is formed by forming the decoration providing protruded and recessed shape to the flexible lens holding member formed of a wire material.

Another aspect is characterized in that the decorative wire assembly is formed by applying the decoration of diagrammatic form or color form to the flexible lens holding member.

Another aspect is characterized in that the flexible lens holding member is composed of a plurality of twisted wire materials and said decorative wire assembly is formed by at least one of said wire materials.

Another aspect is characterized in that the flexible lens holding member is composed of a plurality of twisted wire materials and said decoration is formed by the decorative wire assembly providing a twisted pattern of the twisted wire materials.

Another aspect is characterized in that the flexible lens holding member is composed of a plurality of twisted wire materials and said decorative wire assembly is formed by embedding a jewel as the decoration into said flexible lens holding member.

Another aspect is characterized in that the decorative wire assembly is exchangeable.

It is preferable that the wire material is formed of one of various kinds of fibers such as nylon.

It is preferable that the wire material is formed of a metal wire.

Another aspect is characterized in that the flexible lens holding member comprises a first lens holding member and a second lens holding member, wherein said decorations are the second lens holding member.

The second lens holding member is provided with a decoration member.

It is preferable in that the second lens holding member is able to exchange.

It is preferable that the flexible lens holding member is a fiber thread such as nylon fiber or is a metal wire.

The nature and further features of the present invention will be made more clear through the following descriptions with reference to the accompanying drawings.

BRIEF DESCRIPTION OF THE DRAWINGS

In the accompanying drawings:

FIGS. 10A to 10F illustrate a variety of methods of fixing the decoration shown in FIG. 8;

FIGS. 11A to 11F illustrate other variations of the decoration shown in FIG. 8;

FIG. 17 is a broken view which illustrates a portion of the end fixing portion of the wire shown in FIG. 14;

FIG. 18 illustrates a state where the decoration shown in FIG. 14 and the protection member at the end portion of the rim bar are fastened;

FIGS. 21(A) to 21(C) are views which illustrates a fourth embodiment of spectacles with a decoration according to the present invention;

FIGS. 26(A) to 26(D) illustrates another method fastening the decoration shown in FIG. 25;

FIGS. 28(A), 28(B), 29(A) to 29(C), 30(A) and 30(B) illustrate a variety of wires according to the sixth embodiment;

FIGS. 32, 33(A) and 33(B) illustrate an example of fastening the decoration shown in FIG. 31;

FIG. 39 is a view which illustrates an eight embodiment of spectacles with a decoration according to the present invention;

FIG. 40(A) is a perspective view which illustrates a second aspect of the decoration fitting portion according to the eighth embodiment;

FIG. 40(B) is a cross sectional view taken along line XXXX—XXXX of FIG. 40(A);

FIG. 40(C) is a front elevational view which illustrates an attachment for the decoration;

FIG. 40(D) is a side elevational view of FIG. 40(C);

FIG. 40(E) is a perspective view which illustrates a third aspect of the decoration fitting portion according to the eighth embodiment;

DESCRIPTION OF PREFERRED EMBODIMENTS

Preferred embodiments of the present invention will now be described hereunder with reference to the drawings.

Figure 1:
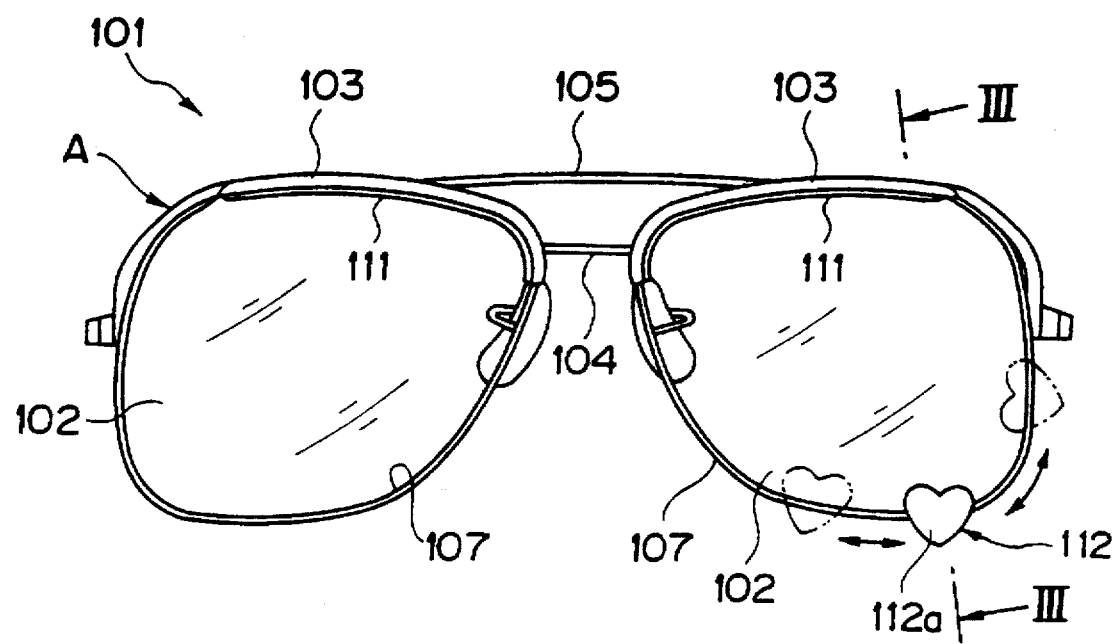
FIG. 1 is a front elevational view which illustrates a first embodiment of spectacles with a decoration according to the present invention.

FIG. 1 is a front elevational view which illustrates a first embodiment of spectacles 101 with a decoration according to the present invention. A pair of metal rim bars 103 disposed along a pair of lenses 102 are connected (brazed) to each other by a metal bridge 104 and a metal brace bar 105.

Figure 3A:
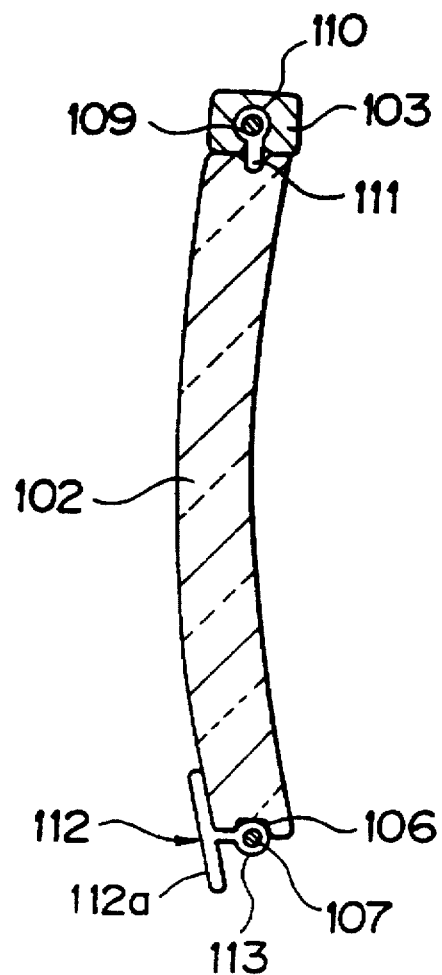
FIG. 3A is a cross sectional view taken along line III—III of FIG. 1.
Figure 3B:
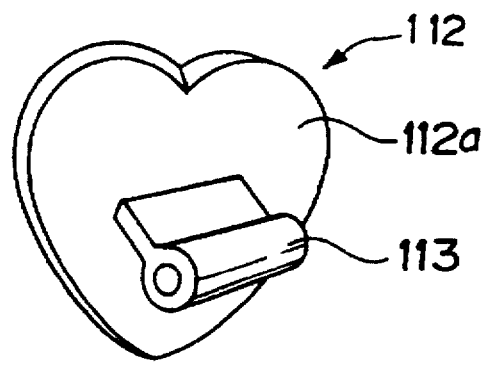
FIG. 3B is a perspective view which illustrates a decoration.

As shown in FIG. 3(A), each of the lenses 102 has a groove 106 formed along the outer end portion thereof so as to receive a wire 107 serving as a linear and flexible lens holding member. The wire 107 is made of a flexible wire such as any one of a variety of fiber threads such as nylon fiber and a thin metal wire and therefore the wire 107 is fitted into the groove 106 so that it is inconspicuous. FIG. 3 exaggeratedly illustrates the wire 107 in order to clearly show the wire 107.

Figure 2A:
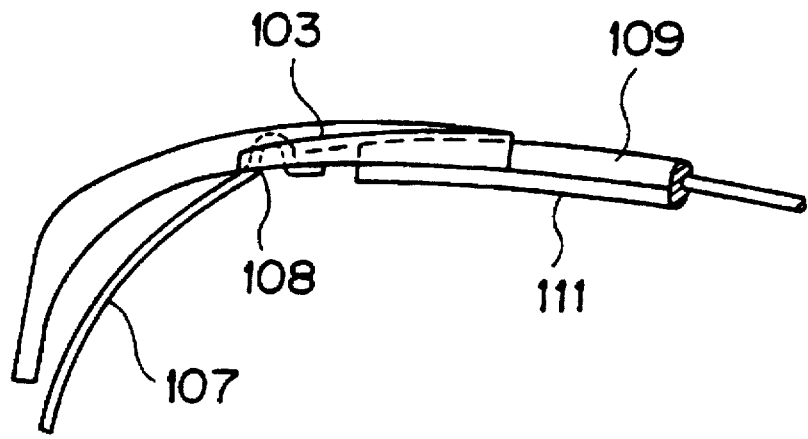
FIGS. 2A, 2B and 2C are views which illustrate end fixing portion of a wire in various view points.
Figure 2B:
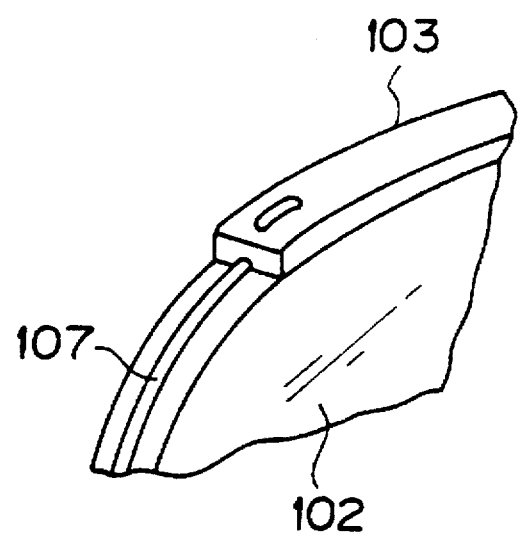
Figure 2C:
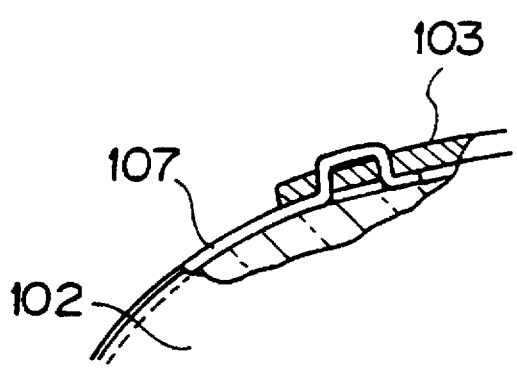

A fastening portion 108 disposed at an end portion of the wire 107 is, as shown in FIG. 2(A), fastened and secured to the rim bar 103. The opposite end portion of the wire 107 is fastened and secured. The top end portion of the lens 102 is secured to the rim bar 103 via a connection member 109. The connection member 109 is, as shown in FIG. 3, embedded in a fixing groove 110 formed in the rim bar 103, and a fastening member III of the connection member 109 is fitted within the groove 106 of the lens 102. Although a wire 109a is connected to the connection member 109, the wire 109a may be formed integrally with the wire 107, serving as the lens holding member, so as to secure the end portion of the wire 107 via the connection member 109.

Reference numeral 112 represents a heart-like decoration supported by the wire 107 which holds the lens 102. The decoration 112 comprises a decoration member 112a and a fastening pipe 113 as a fitting member. In this embodiment, the decoration 112 is supported by the wire 107 which passes through a hole formed into a fastening pipe 113 which is a portion of the decoration 112 and which serves as fitting means. The fastening pipe 113 is disposed in the groove 106, formed on the outer surface of the lens 102 in such a manner that it is held, positioned and secured by the inserted wire 107 and the lens 102.

Figure 4A:
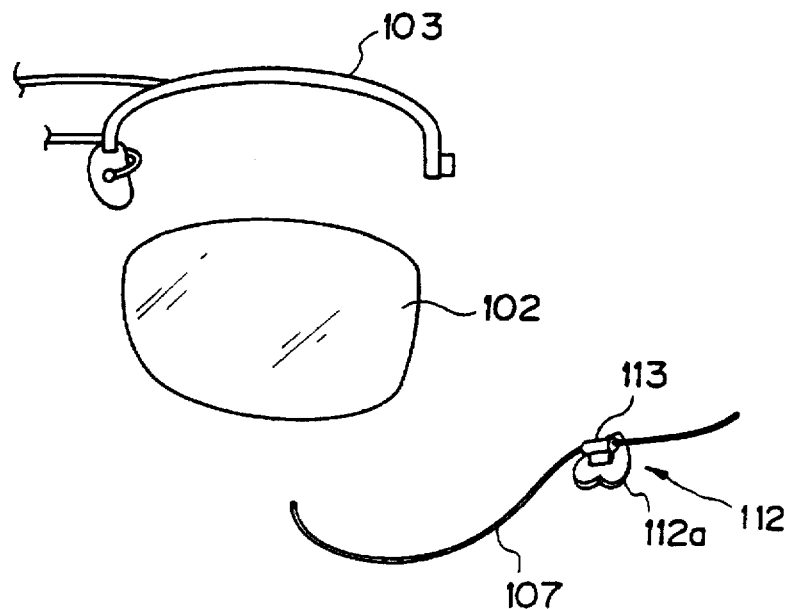
FIGS. 4A to 4D illustrate the spectacles showing the decoration attachment or detachment.
Figure 4B:
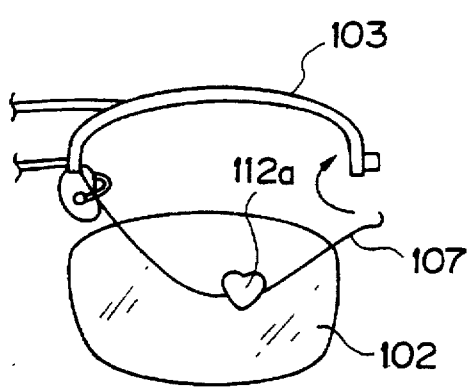
Figure 4C:
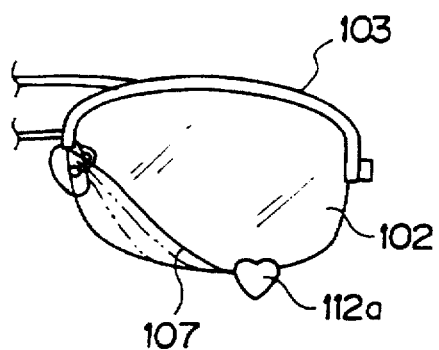
Figure 4D:
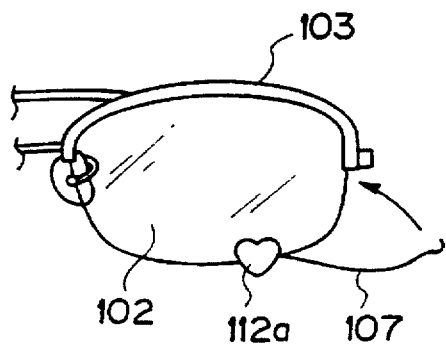

The decoration 112 is fastened to the spectacles 101 in such a manner that the wire 7, which has been inserted into the fastening pipe 113, is arranged into the groove 106, formed in the outer surface of the lens 102, and the wire 107 is tightened up in the process of assembling the spectacles 101. Therefore, the decoration 112 can be exchanged with another decoration by removing the wire 107. The lens 102 is fastened, for example, as shown in FIGS. 4A, 4B and 4C, in such a manner that the two end portions of the wire 107, having a predetermined length, are secured to the rim bar 103 prior to the fastening of the lens 102, and then the lens 102 is fitted. The lens 102 may be fastened by any one of a variety of methods. For example, the lens 102 may be secured in such a manner that an end portion of the wire 107 is secured to the rim bar 103 and another end portion of the wire 107 is arranged along the lens 102 before the wire 107 is tightened up to a predetermined tension. Furthermore, another fastening method may be employed.

As described above, the decoration 112 can be fastened to the periphery of the lens 102 of the spectacles 101 of the type having the frame in which grooves are formed, causing a satisfactory decorative design to be realized. Furthermore, the structure, in which the wire 107 is allowed to pass through the fastening pipe 113, will prevent the separation of the decoration 112. Therefore, a high priced jewel, or the like, can be safely used as the decoration.

Furthermore, the decoration 112 can be located, and held, at a predetermined position by the frictional fastening force realized from the structure in which the decoration 112 is held, as described above. Furthermore, the decoration 112 can be transferred to an arbitrary position along the wire 107 by the force larger than a frictional fastening force.

Figure 5:
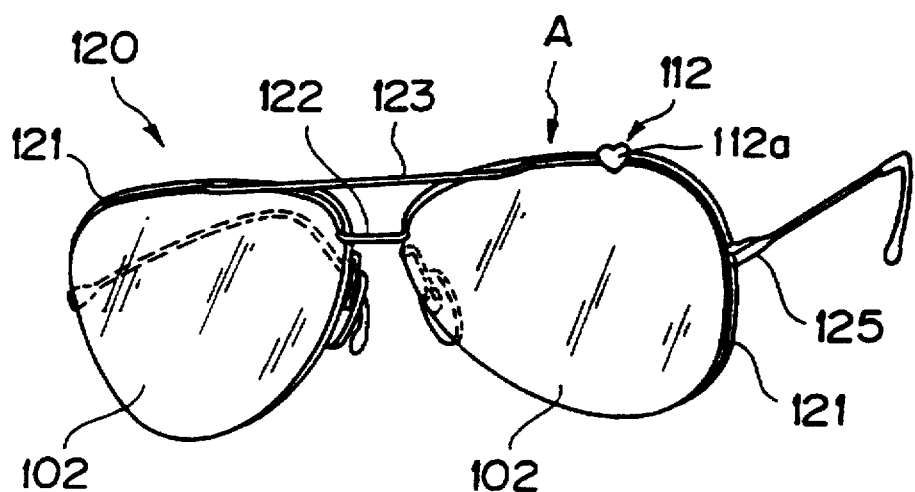
FIG. 5 is a perspective view which illustrates the spectacles with a decoration when a thin metal wire is used as the wire.
Figure 6:
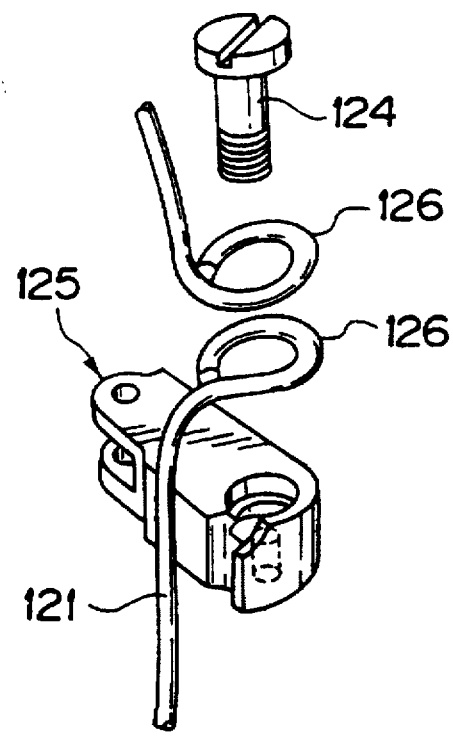
FIG. 6 is an exploded perspective view which illustrates the end portion of the wire shown in FIG. 5.

FIG. 5 illustrates a first aspect of the first embodiment of the present invention. The lenses 102 are held by wires (holding members) 121 arranged for the overall length of grooves (omitted from illustration), the lenses 102 being connected to each other by a bridge 122 and a brace bar 123. Reference numeral 112 represents a decoration fastened by the structure arranged similarly to the aforesaid first embodiment of the present invention. The wire 121 has, at the two end portions thereof, annular fixing portions 126 arranged as shown in FIG. 6, the annular fixing portions 126 each being fastened by a screw 124 so as to be secured to a joint 125.

FIG. 7 illustrates another example of a fastening member 130 serving as means for fastening the decoration 112. The fastening piece 130 shown, in FIGS. 7A to 7C, is formed into a hook so as to be secured by hooking the wire 121.

In the case where the aforesaid fastening piece 130 is used, the fastening piece 130 can be fastened, or removed, independently from the wire 121 while tightening up the wire 121 by inserting the hook portion between the wire 121 and the lens 102 because the fastening piece 130 is formed into a hook.

The decoration 112 may be fastened by any one of a variety of other methods such as welding, adhesion, and tying.

Figure 7A:
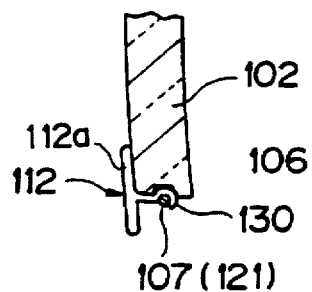
FIGS. 7A to 7H illustrate various methods of fastening the decoration shown in FIG. 1.
Figure 7B:
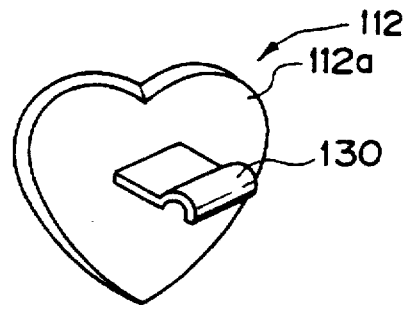
Figure 7C:
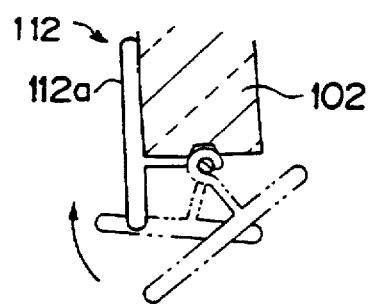
Figure 7D:
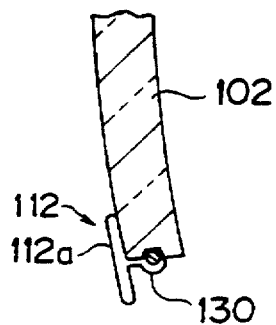
Figure 7E:
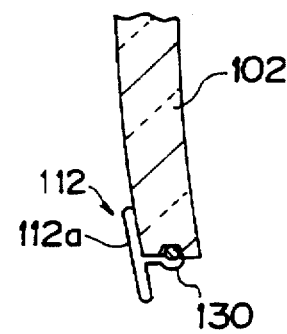
Figure 7F:
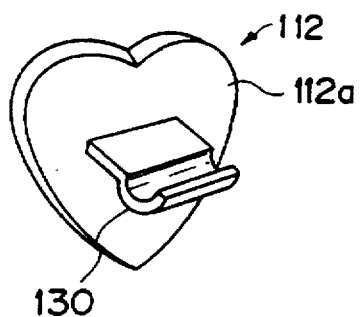
Figure 7G:
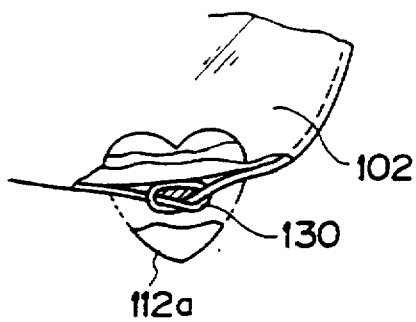
Figure 7H:
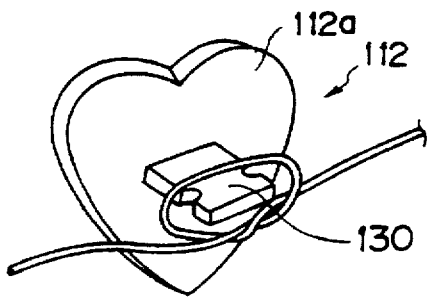

FIG. 7D illustrates the case where the decoration 112 is allowed to adhere to the wire 102 by using an adhesive. FIG. 7E illustrates the case where the same is directly welded to the wire 102, and FIGS. 7G and 7H illustrate the case where the decoration is tied up with the wire 102.

Although the position at which the decoration 112 is fastened is fixed in the case where the decoration 112 is allowed to adhere or welded to the wire 102, the same can be fixed, or moved, to an arbitrary position in the case where the decoration 112 is tied up with the wire 102.

Although the decoration 112 is formed into a heart-like shape in the aforesaid embodiment, it may be formed into a star-like shape, diamond-like shape, a flower-like shape, etc.

As described above, the decoration 112 is supported by utilizing the wires 107, or 121, for holding the lens 102 on the body of the spectacle frame. Therefore, the decoration 112 can be significantly easily fastened to the periphery of the lens 102 and design freedom can be enhanced.

FIGS. 8 to 14 illustrate a second embodiment of spectacles with a decoration.

Figure 8:
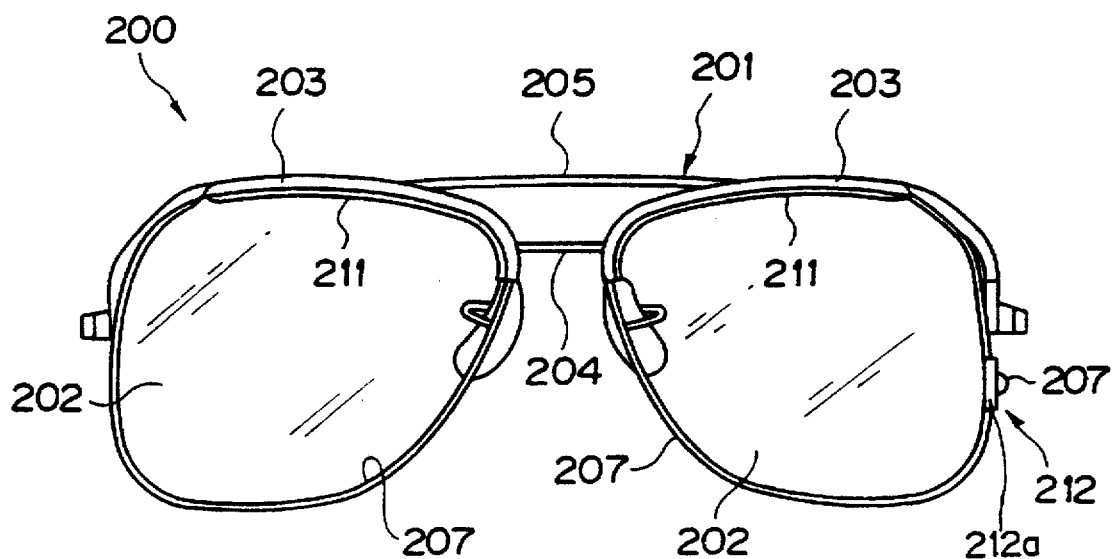
FIG. 8 is a front elevational view which illustrates a second embodiment of spectacles with a decoration according to the present invention.

Referring to FIGS. 8 and 9, reference numeral 200 represents a spectacle body comprising a spectacle frame body 201 and wires 207 serving as flexible lens holding members for suspending lenses 202 to rim portions 203 of the spectacle frame body 201.

The wires, 207 are made of wires such as, nylon wires or metal wires, and are wound around the lenses 202. Each of the lenses 202 has a groove 206 into which the wire 207 is received. The two end portions of the wire 207 are secured to the rim portion 203 of the spectacle frame body 201 so that the lens 202 can be strongly held by the spectacle frame body 201 by virtue of the tension of the wire 207.

The spectacle frame body 201 is arranged in such a manner that a pair of rim bars 203, disposed along the upper portions of a pair of lenses 202, are connected to each other by a bridge 204 and a brace bar 205. The top end portion of the lens 202 is secured to the rim bar 203 via a connection member 209. The connection member 209 is embedded in a fixing groove 210 formed in the rim bar 203. A fastening claw 211 is received by a groove 206 formed in the lens 202.

Figure 9A:
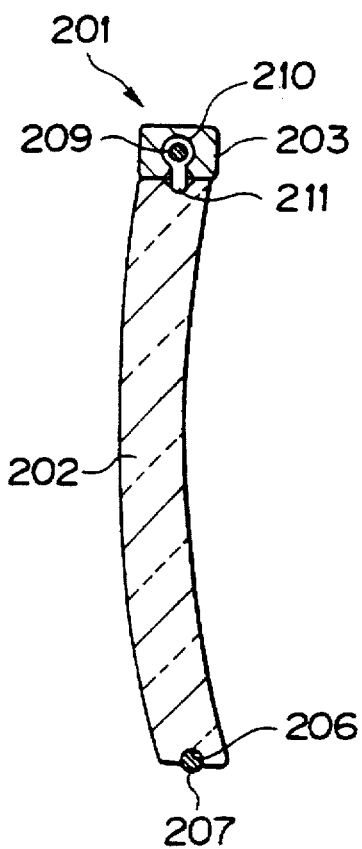
FIG. 9A is a vertical cross sectional view of the spectacles shown in FIG. 8.
Figure 9B:
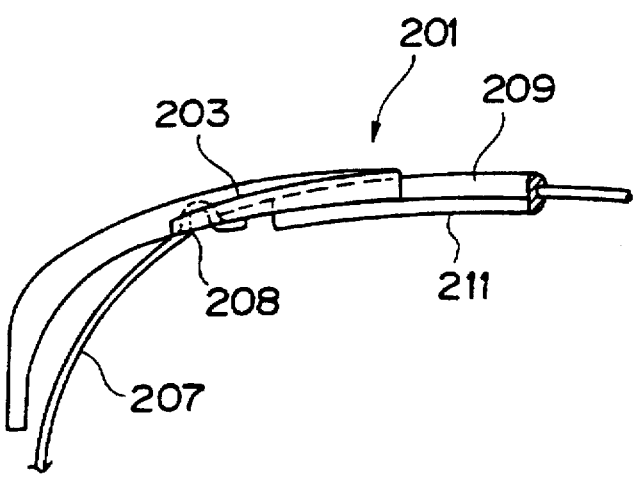
FIG. 9B is a partial front elevational view which illustrates the end fixing portion of the wire.

Furthermore, a terminative fastening portion 208 of the wire 207 is, as shown in FIG. 9B, secured to the rim bar 203. Also another end portion of the wire 207 is secured in a similar manner.

A decoration 212 is fastened to the wire 207. The decoration 212 comprises a decoration member 212a and a fastening holes 213 as a fitting means. The decoration member 212a is made of a resin, metal, imitation cloisonne. The decoration 212 is, as shown in FIGS. 10A and 10B, secured to the periphery of the lens 202. That is, the decoration 212 has a width which is substantially the same as the thickness of the lens 202 and has two through fastening holes 213 formed in the direction of the width. The wire 207 is, as shown in FIG. 10A, inserted into the fastening hole 213 from the backside of the decoration 212, the same passes along the surface of the decoration 212, and the same again passes through the other fastening hole 213 so as to reach the backside. Therefore, the wire 207 is bent to form a loop, that is, a holding force enlargement means.

In the aforesaid structure, the decoration 212 is held in such a manner that it is pushed toward the periphery of the lens 202. Since the wire 207 is formed in the loop, friction resistance generated in cooperation with the decoration 212 is enlarged by the pressing force acting as a component force of the tension of the wire 207 on the position with which the bent portion of the wire 207 comes into contact. Therefore, the holding force is enlarged, causing an effect to be obtained in that the decoration 212 is not undesirably moved along the wire 207 even if an external force acts on the decoration 212 due to contact of the hand or a substance. Furthermore, the field of view is not undesirably shielded.

Since the decoration 212 can, of course, be transferred by applying the force larger than the friction resistance, the position at which the decoration 212 is fastened can be fixed or the same can be made adjustable.

FIGS. 10C, 10D and 10E, illustrate a second aspect of the second embodiment of the present invention. This aspect is arranged in such a manner that a circular-arc fastening hole 214 is formed in the decoration member 212a and the wire 207 is inserted into the fastening hole 214.

In the case of the second aspect, the appearance can be simplified and a further improved decorative effect can be obtained, in addition to the effect obtainable from the first aspect, because the wire 207 does not appear on the surface of the decoration 212.

The loop of the wire 207 inserted into the fastening holes 213 may be tied, as shown in FIG. 10F. In this case, the undesirable moving of the decoration 212 can be further reliably prevented.

FIGS. 11A and 11B illustrate a third aspect of the second embodiment.

A decoration 215 comprises a decoration member 215a, which is formed into a circular-arc-like shape and a fastening bar 216 as the fitting means. The wire 207 is arranged to pass through the bar 216 so as to hold the decoration 215.

According to this aspect, the holding force can be enlarged by the friction resistance generated by the looped wire 207 and the fastening bar 216 so that an effect similar to that obtainable from the first aspect is obtained.

The wire 207 may be tied up with the fastening bar 216 as shown in FIG. 11F.

FIGS. 11C, 11D and 11E illustrate a fourth aspect. A decoration 217 comprises a decoration member which is formed into a circular-arc-like shape having the surface in which a jewel 218 is embedded. The decoration 217 includes a fastening pipe 219 into which the wire 207 is inserted so as to hold the decoration 217.

According to the fourth aspect, the decoration effect can be further improved due to the use of the jewel 218 in addition to the effect similar to that obtainable from the first aspect. Since the fastening pipe 219 has a large area positioned in contact with the wire 207, larger holding force can be realized in comparison with the third aspect.

Figure 12A:
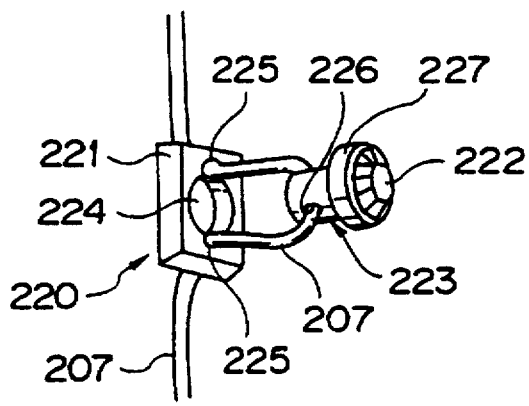
FIGS. 12 to 14 illustrate other variations of the decoration shown in FIG. 8.
Figure 12B:
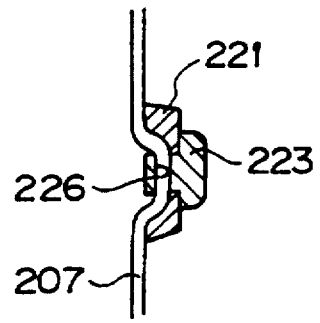
Figure 12C:
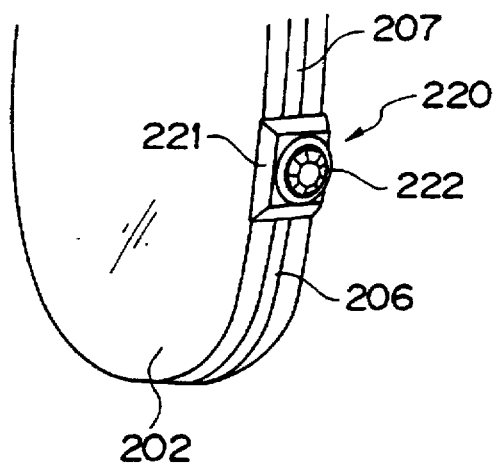

FIGS. 12A, 12B and 12C illustrate a fifth aspect of the second embodiment. A decoration 220 comprises a plate-like base 221 and a decoration member 223 having a head 227 in which a jewel 222 is embedded. The base 221 has a fastening through hole 224 formed in the direction of the thickness thereof. Furthermore, a pair of circular-arc-like cut portions 225 are formed while interposing the fastening through hole 224.

The decoration member 223 is formed into a cylinder having an outer diameter which can be inserted into the fastening hole 224, the decoration member 223 having a fastening hole 226 formed therein. The wire 207 is inserted into the fastening hole 226 via one of the cut portion 225 and the same is then inserted into the residual cut portion 225. The height of the cylindrical portion of the decoration member 223 is made to be the same as, or slightly lower, than the thickness of the base 221. Furthermore, the head portion 227 has a diameter which is larger than that of the fastening through hole 224.

In the thus arranged structure, the decoration member 223 is inserted into the fastening through hole 224 and tension is given to the wire 207 so that the base 221 and the decoration member 223 are integrally secured to the periphery of the lens 202 as shown in FIG. 12C. When the head portion 227 comes in contact with the base 221, the wire 207 is formed into a loop as shown in FIG. 12B. Therefore, the holding force can be enhanced by virtue of the friction resistance generated by the wire 207 and the decoration member 223 so that the undesirable movement of the decoration 220 is prevented.

Figure 12D:
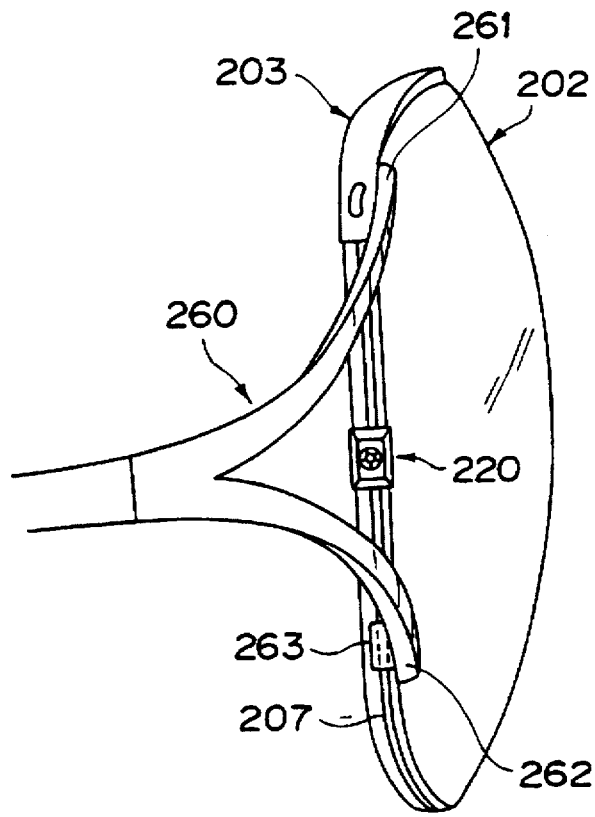

FIG. 12D illustrates a structure in which the decoration 220 is fastened between arms 261 and 262 of a forked joint 260. The lower arm 262 of the joint 260 has a fastening portion 263 to which the wire 207 is fastened.

Figure 13A:
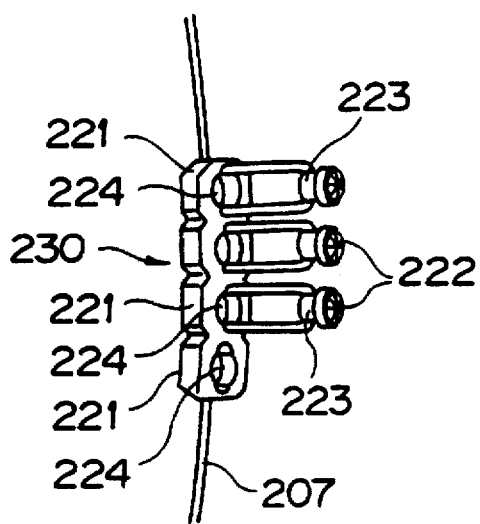
Figure 13B:
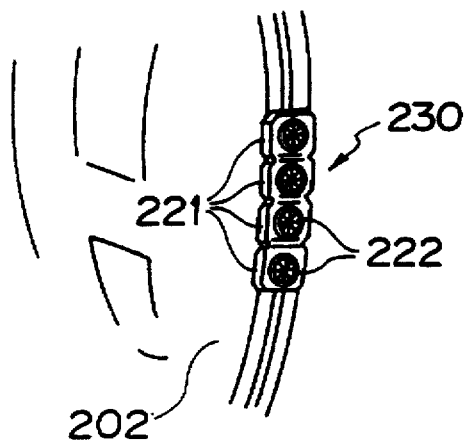

FIGS. 13A and 13B illustrate a sixth aspect. A decoration 230, according to this aspect, is constituted by connecting a plurality of the bases 221 according to the fifth aspect and by disposing the decoration members 223 according to the fifth embodiment are connected by a number which is the same as that of the bases 221. The other structure is the same as that of the fifth aspect. The base 221 is warped to fit the outer shape of the lens 202.

Although the effect is the same as that obtainable from the fifth aspect, the number of the loops formed by the wires is increased and therefore the overall holding force is enlarged. Furthermore, colors and shapes of the jewels 227 may be arbitrarily employed to vary the design and the decoration members 223 and the jewels 222 are individually changed by drawing out the wire 207. Thus, an excellent decorative effect can be attained.

Figure 13C:
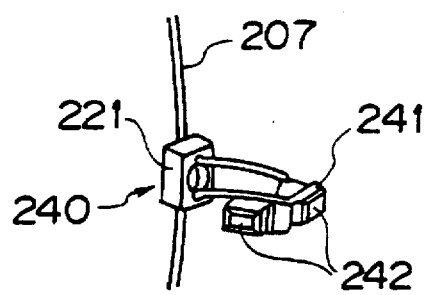
Figure 13D:
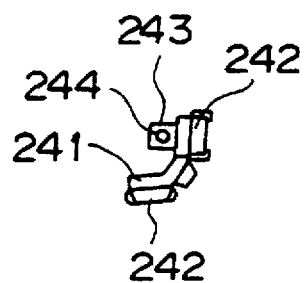

FIGS. 13C and 13D illustrate a seventh aspect. A decoration 240 similar to the aforesaid aspect, composed of a base 221 and two jewels 242 is secured to a frame 241 formed into a bent shape, the frame 241 having a shaft portion 243. The shaft portion 243 has a hole 244 formed therein so as to insert the wire 207 into the hole 244 so that the outer portion of the lens 202 is secured.

Also, according to this aspect, the wire 207 is formed into a loop, the holding force is enlarged similarly to the aforementioned aspects. Furthermore, one of the jewels 242 decorates the front surface of the lens 202.

Figure 13E:
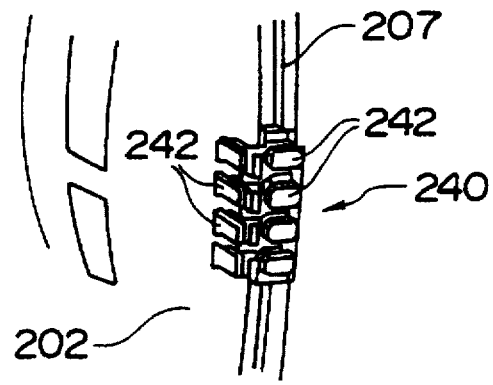

FIG. 13E illustrates an eighth aspect which is arranged in such a manner that a plurality of the bases 221, according to the seventh aspect, are integrally connected to one another and also the decorations 240 are fastened by the number corresponding to the number of the bases 221. The wire 207 is arranged to pass through the decorations 240 to form loops and held at the surface of the bases 221. The obtainable effect is the same as that obtainable from the seventh aspect.

Figure 14A:
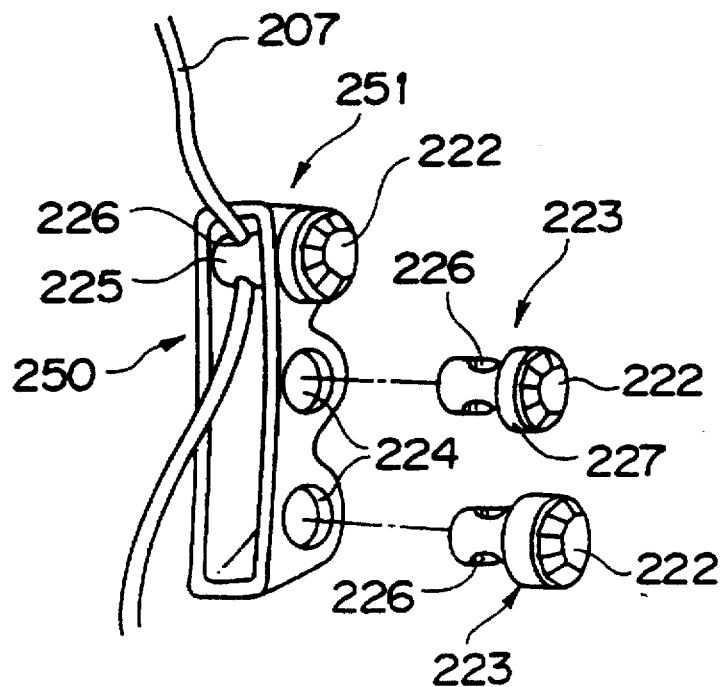
Figure 14B:
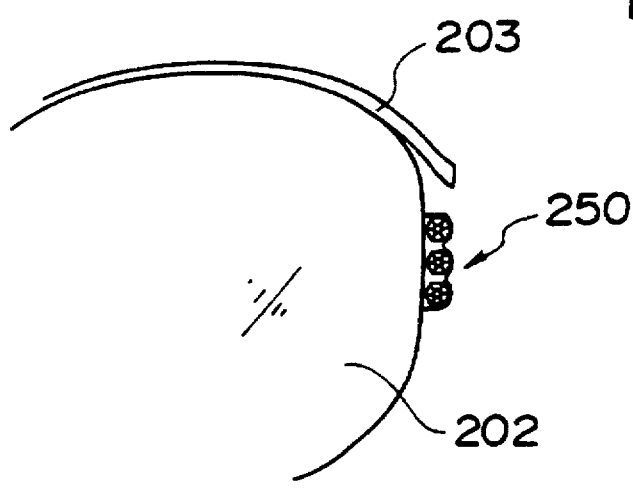
Figure 14C:
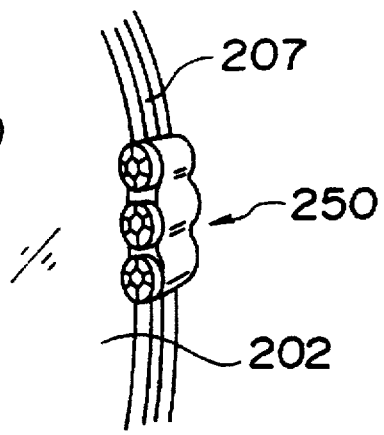

FIGS. 14A, 14B and 14C illustrate a ninth aspect. A decoration 250 comprises a base 251 and a decoration member 223 into which the jewel 222 is fitted. The decoration member 223 is arranged similarly to that shown in FIG. 12.

The base 251 is formed into a hollow shape having an opening formed on one of the side surfaces thereof, the base 251 having a plurality of the fastening through holes 224 on the other side surface thereof. The decoration member 223 is inserted into the fastening through hole 224, and the wire 207 is inserted into each of the fastening holes 226. By virtue of the tension of the wire 207, the decoration member 223 is fastened to the lens 202. The wire 207 is formed into the loop due to the presence of a plurality of the decoration members 223, and the friction force generated by the loop will enlarge the holding force. Therefore, the decoration 250 cannot be transferred by an external force.

This aspect can be adapted to spectacles of a wraparound spectacles formed by integrating the upper and the lower frames and the bridge.

FIGS. 15 to 20 illustrate a third embodiment of a pair of spectacles with a decoration according to the present invention.

Figure 15:
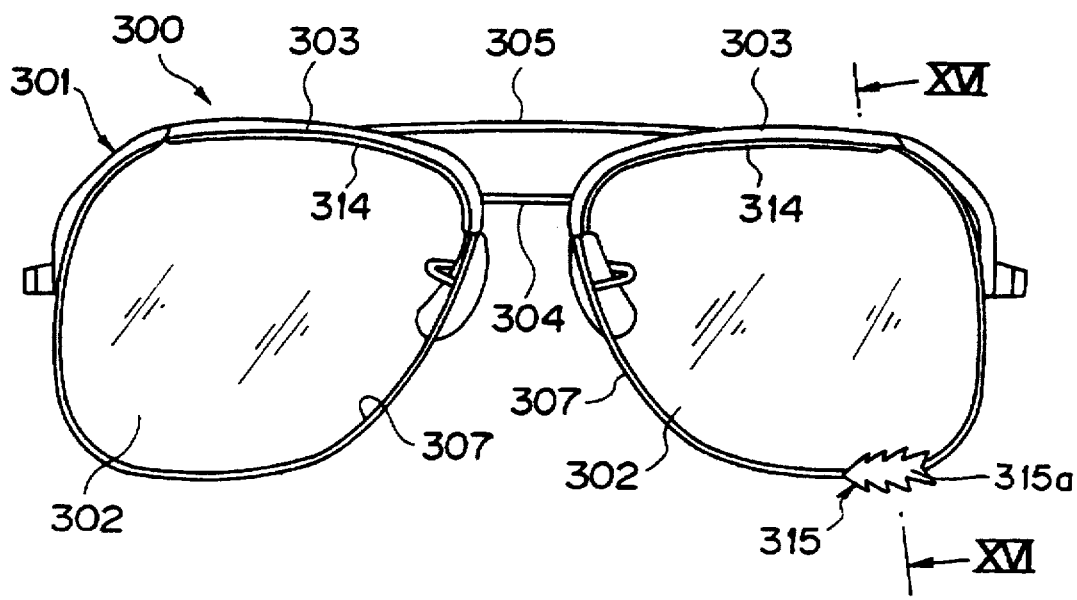
FIG. 15 is a front elevational view which illustrates a third embodiment of spectacles with a decoration according to the present invention.
Figure 16:
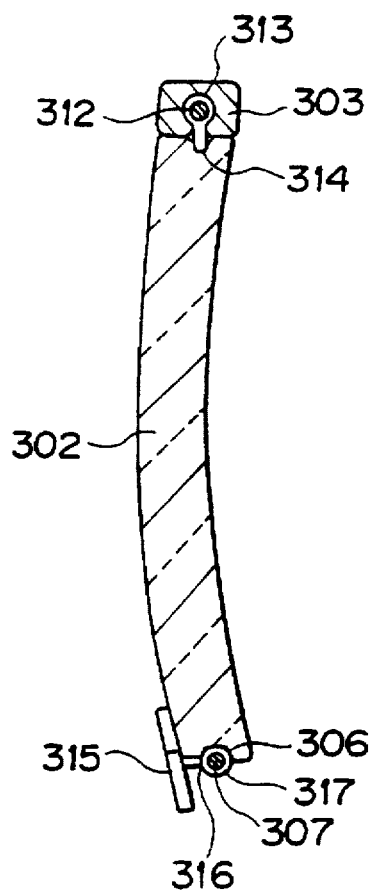
FIG. 16 is a cross sectional view taken along line XVI—XVI of FIG. 14.
Figure 19A:
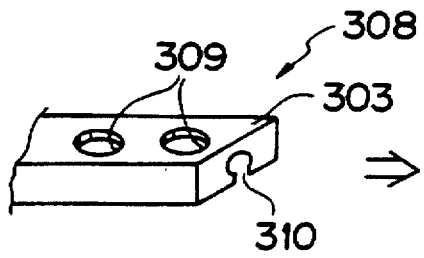
FIGS. 19 and 20 illustrate another state where the decoration shown in FIG. 14 and the protection member at the end portion of the rim bar are fastened.
Figure 19B:
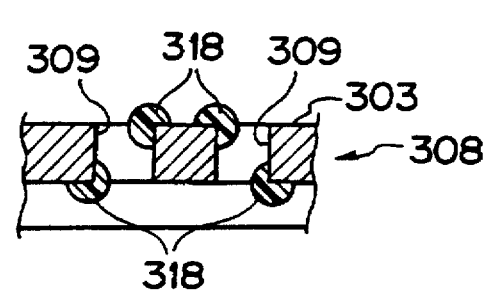
Figure 19C:
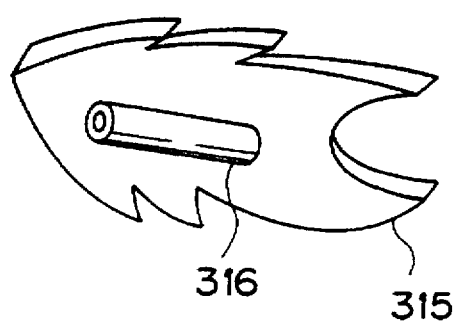
Figure 19D:
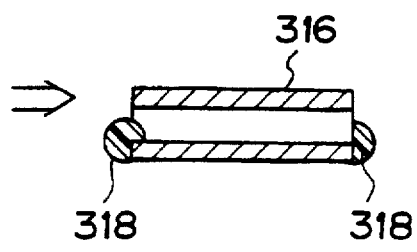

Referring to FIGS. 15 and 16, reference numeral 300 represents a body of spectacles. The spectacles 300 comprises a spectacle frame body 301 and a wire 307 serving as a flexible lens holding member for suspending the lens 302 from a rim portion 303 of the spectacle frame body 301. The wire 307 is made of a fiber thread, such as, a nylon wire or a metal wire, the wire being wound around the lens 302. The lens 302 has, in the outer surface thereof, a groove 306 which receives the wire 307.

The spectacle frame body 301 is constituted by integrally connecting a pair of the rim bars 303 disposed along the upper portions of a pair of the lenses 302, a pair of the rim bars 303 being connected by a bride 304. The top end portion of the lens 302 is secured to the rim bar 303 via a connection member 312. The connection member 312 is embedded in a fixing groove 313 formed in the rim bar 303. Furthermore, a fastening member 314 is fitted in a groove 306 formed in the lens 302.

The two end portions of the wire 307 secured to the rim bar 303 as shown in FIG. 17.

In this embodiment, a decoration 315 is fastened to the wire 307 in such a manner that the decoration 315 is secured by the wire 307 inserted into a hole formed into a fastening pipe 316 disposed on the decoration member 315a. Furthermore, a protection member is used for the purpose of protecting a portion which is positioned in contact with the fastening pipe 316.

That is, T-shape washers 317 made of soft material and therefore having large friction resistance are disposed at the two end portions of the fastening pipe 316 which is a portion of the decoration 315. The T-shape washer 317 may be made of soft material (nylon, vinyl chloride, silicon or urethane), elastomer (polyester of the like), or (silicon or the like) rubber.

The wire 307 is inserted into the fastening pipe 316 via the T-shape washer 317.

Since the wire 307 and the decoration 315 are positioned in contact with each other, via the T-shape washer 317 as described above, slippage can be prevented and therefore the position of the decoration 315 cannot easily be changed.

Furthermore, also a member for protecting the wire is used at the fastening portion of the end portion of the wire 307.

The fastening portion 308 has two holes 309 in the longitudinal direction thereof. Furthermore, the fastening portion 308 has, at the end surface thereof, a recess 310 which has a circular cross section to receive the wire 307. The two holes 309, which come in contact with the wire 307, include I-shape washers 311 made of soft material and having larger friction resistance, the I-shape washers 311 serving as the projection members for protecting the wire 307. The material of the I-shape washer 311 is the same as that of the T-shape washers 317. A hooked portion at the end of the wire 307 is received by the I-shape washer 311 so as to be secured to the rim bar 303.

In the thus arranged spectacles, since the fastening portion 308 which fastens the hooked portion at an end portion of the wire 307 and the rim bar 303 to each other is arranged in such a manner that the portion in which the hooked and the fastening portion 308 are positioned in contact with each other via the I-shape washer 311 made of soft material and having large friction resistance. The slippage of the wire 307 can be prevented and undesirable rubbing can be prevented, causing the wire 307 to be protected from breakage. Furthermore, tension can be applied to the fastening portion 308 because slippage and rubbing can be prevented.

FIG. 19 illustrates a second aspect of the third embodiment of the present invention. Although the aforementioned first aspect is arranged in such a manner that the washers 311 and 317 are respectively disposed in the fastening portion 308, in which the wire 307 and the rim bar 303, which comes in contact with the wire 307 and which serves as the other member, are fastened to each other, and the cylindrical fastening member 316 of the decoration 315, this aspect is arranged in such a manner that members 318 made of the same material as that of the washers 311 and 317 and serving as the protection members are applied to the portion which comes in contact with the wire 307. Since the other structure and the operation are the same as those according to the first aspect, the same elements are given by the same reference numerals and their descriptions are omitted here.

Figure 20A:
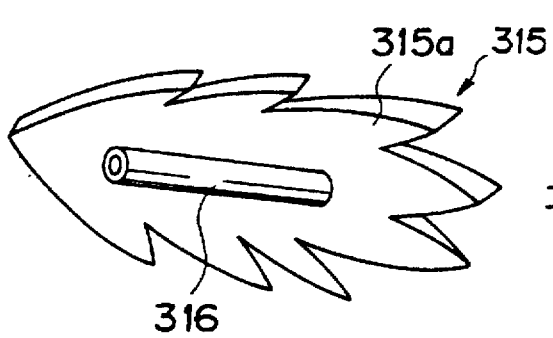
Figure 20B:
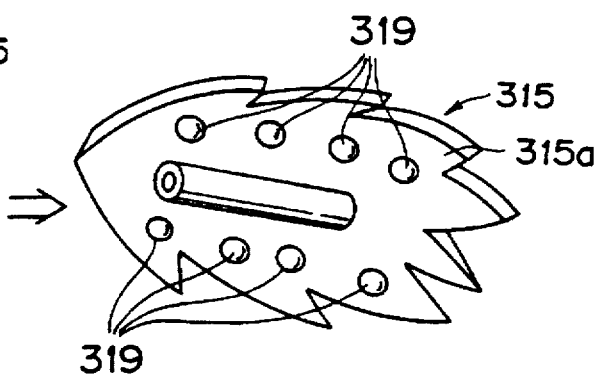
Figure 20C:
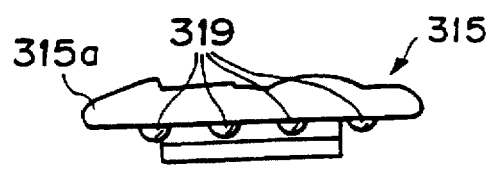

FIG. 20 illustrates a third aspect of the third embodiment of the present invention, in which a plurality of projections 319 made of the same material as that of the washers 311 and 317 according to the first aspect are disposed in the portion of the decoration 315 which comes in contact with the lens 302, the decoration 315 being brought into contact with the wire 307. Since the other structure and the operation are the same as those according to the first aspect of the third embodiment, the same elements are given by the same reference numerals and their descriptions are omitted here.

Since the third aspect is arranged in such a manner that protection members made of soft material and having large friction resistance are disposed in the portion which is positioned in contact with the wire 307, the undesirable positional deviation between the decoration and the wire can be prevented. Therefore, rubbing can be prevented and therefore the breakage of the holding member can be prevented. In addition, since the deviation can be prevented, the slippage can also be prevented and the other member fastened to the holding member cannot easily be slipped.

FIGS. 21 to 24 illustrate a fourth embodiment of the present invention.

FIG. 21 illustrates a first aspect of the fourth embodiment in which a pair of rim bars 403 disposed along the upper portion of a pair of lenses 402 of spectacles 400 are connected to each other by a bridge 404. Furthermore, a temple 406 is fastened to each of separation portions 405 disposed at the end portions of the rim bars 403. The lens 402 has a groove 407 formed along an outer end 402a thereof. The groove 407 receives a wire 408 (made of nylon or metal) wound thereto, the wire 408 serving as a flexible lens holding member which is able to exchange.

The wire 408 to be received by the groove 407 is made of two wires (first wire 408a and second wire 408b) which are bundled in place of being twined as shown in FIG. 21C.

An end portion of a first wire 408a of the two wires 408 is secured to the rim bar 403, while the other end thereof is secured to the rim bar 403, similarly. An end portion of the wire 408 may be secured to the rim bar 403, via a connection member 409, so as to hold the lens 402. In a predetermined region C from a predetermined position 402b of a periphery 402a of the lens 402 to the separation portion 405 serving as a separation portion located away from a predetermined position 402b of the periphery 402a of the lens 402, a second wire 408b is arranged between the separation portion 405 and the periphery 402a while being applied with tension so that it is positioned away from the periphery 402a of the lens 402. In the other portions, the second wire 408b is wound around the periphery 402a of the lens 402 similarly to the wire 408a. Furthermore, the wires 408a and 408b relate to each other in the predetermined region C.

In the predetermined region C of the wire 408b located away from the periphery 402a of the lens 402, decorations 410 comprise the second wire 408b as the second lens holding member being provided with a decoration member 411.

Since the thus constituted embodiment is arranged in such a manner that the wire 408b which is one of the two wires 408 is arranged from the predetermined position 402b of the periphery 402a of the lens 402 to the separation portion 405 to be located away from the periphery 402a of the lens 402, the wire 408b serves as a holder for the decoration member 411 to improve an effect of decoration.

Furthermore, the decoration member 411 are fastened to the central portion of the wire 408b which is arranged, as described above, so that the effect of decoration is improved.

In addition, the structure in which the wire 408b is arranged, while being applied with tension in the predetermined region C, will cause an effect of decoration to be obtained from the shape of the arranged wire 408b under the tension in the predetermined region C. Therefore, the effect of decoration can be further improved. Furthermore, since the wire 408b is, under the tension, arranged between the separation portion 405 and the predetermined position 402b of the periphery 402a of the lens 402, the force for holding the lens 402 can be enlarged.

Another aspect of the fourth embodiment will now be described. The same elements as those according to the first aspect are given by the same reference numerals and their descriptions are omitted here.

Figure 22A:
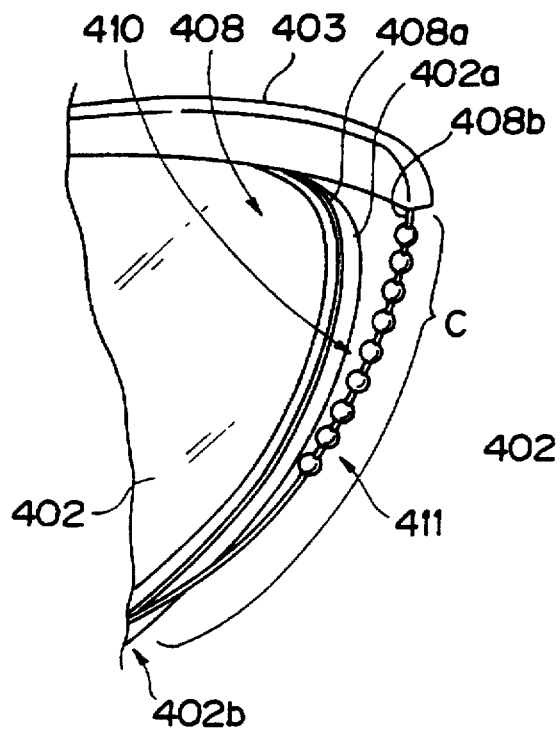
FIGS. 22(A) to 22(D) illustrates another example of the decoration shown in FIG. 21.

FIG. 22A illustrates a structure in which the second wire 408b is arranged in the predetermined region C in such a manner that no tension is applied to the same. In this case, the predetermined region C, to which the decorations 410 are fastened, can be widened so that the design freedom can be enlarged since large size decoration 410 can be fastened or the number of the same can be increased.

Figure 22B:
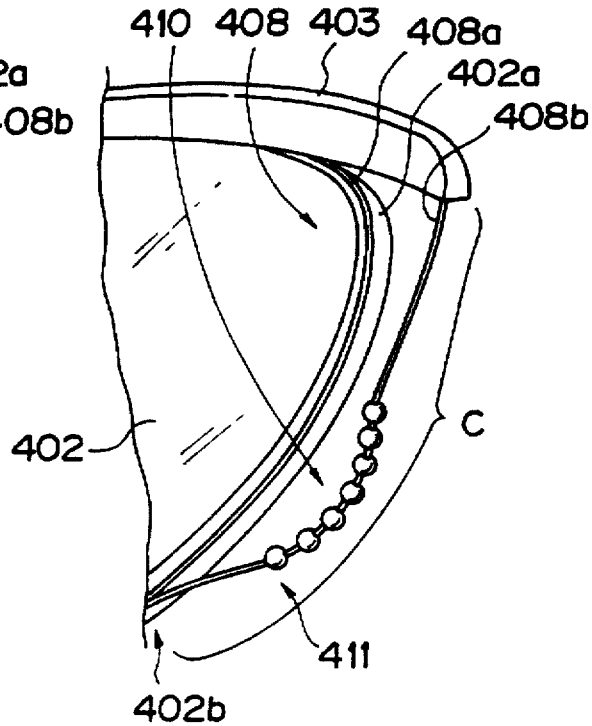

FIG. 22B illustrates a structure in which the wire 408b is arranged in a further loosened and dangled manner in comparison to the structure shown in FIG. 22A. In this case, the dangled portion of the wire 408b is able to swing, causing an effect of decoration to be further improved. When the decorations 410 are fastened to the dangled portion, the effect of decoration can be further improved.

Figure 22C:
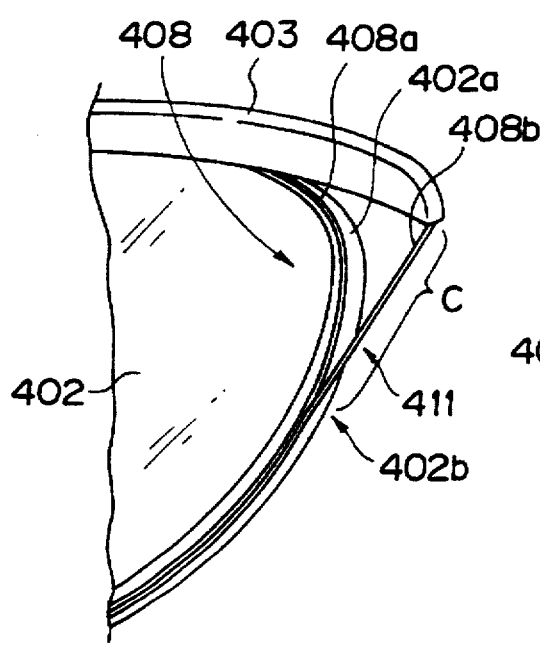
Figure 22D:
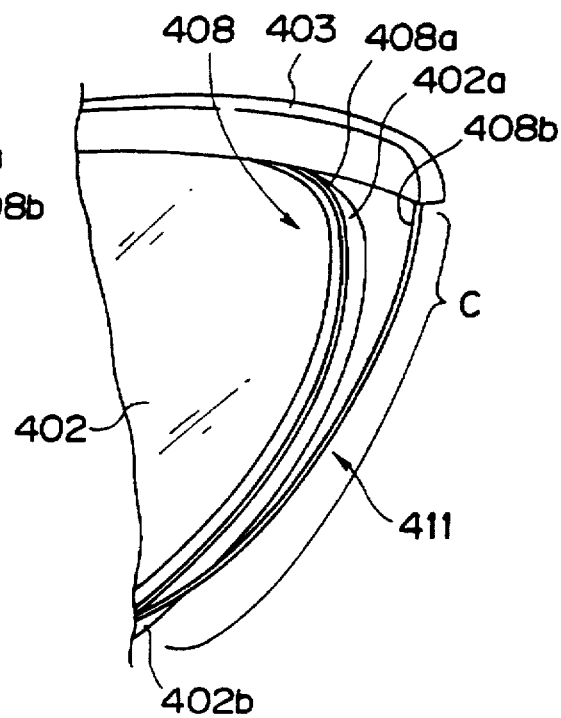

If the decoration members are not fastened as shown in FIGS. 22C and 22D, and if the wire 408b is simply arranged between the periphery 402a of the lens 402 and the separation portion 405, the wire 408b is able to exhibit its effect of decoration as described above.

Figure 24A:
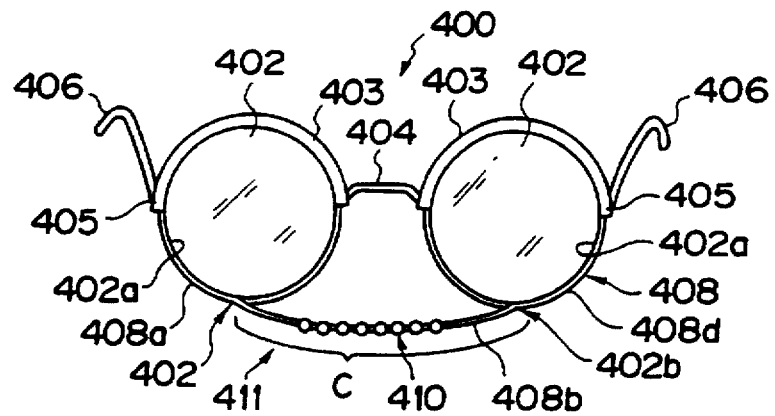
FIGS. 24A to 24F illustrate a variety of states of fastening the decoration according to the fourth embodiment.
Figure 24B:
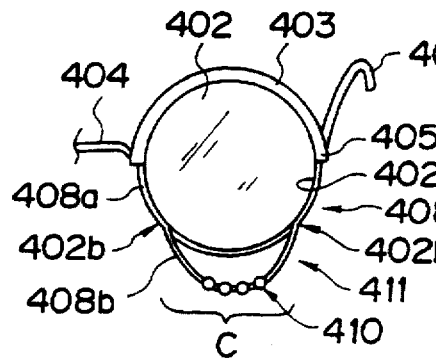

FIG. 24A illustrates a structure in which a second wire 408b, which is the holder for the decoration member 411, is separated from the wire 408a for holding the right and left lenses 402 so as to be a plurality of wires in the predetermined region C, the separated wires 408b being then connected to one another. Also in this case, the lens holding wire 408a and the wire 408b which is the component of the decoration member are related to each other. FIG. 24B illustrates a structure in which the wire 408b which is the holder for the decoration member is separated from the lens holding wire 408a so as to become a plurality of wires in the predetermined region C, a plurality of the wires being then again connected to the lens holding wire 408a.

Figure 24C:
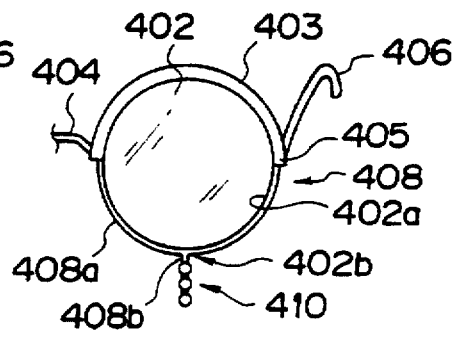

FIG. 24C illustrates a structure in which the wire 408b which is the holder for the decoration member, is separated from the lens holding wire 408a but the same does not constitute a plurality of the wires in the predetermined region.

Figure 24D:
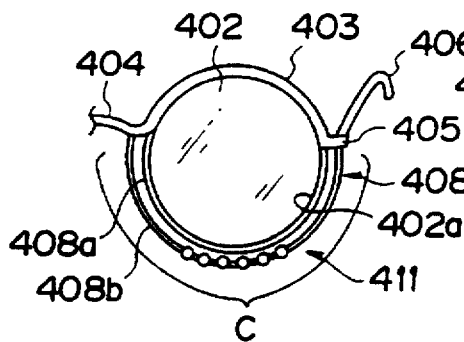

FIG. 24D illustrates a structure in which the lens holding wire 408a and the wire 408b, which is the component of the decoration are formed into similar shapes to be related to each other and the wire 408 is not branched.

Figure 24E:
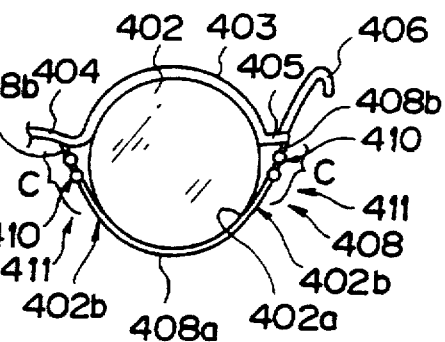

FIG. 24E illustrates a structure in which the wire 408 simply holds the lower end portion of the lens 402, the wire 408 is not arranged around the lens 402, and the end portion of the wire 408 is fastened to the separation portion 405. In this case, the single wire 408 is not branched and is sectioned into the second wire 408b which is the component of the decoration and the lens holding wire 408a in the predetermined region C and the other regions.

Figure 24F:
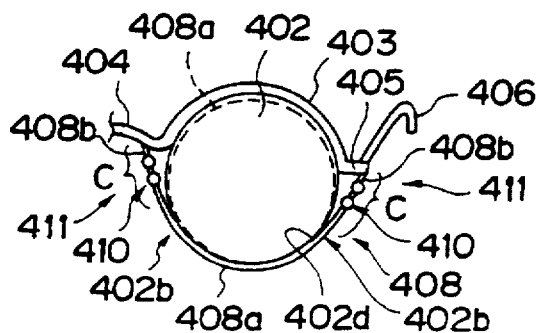

FIG. 24F illustrates a structure in which the single wire 408 is arranged around the lens 402 plural times and then the end portion of the wire 408 is fastened to the separation portion 405. The structure in this case is the same as that shown in FIG. 24E except for the number of windings of the wire 408 around the lens 402.

Also according to the structure shown in FIG. 24, a similar effect to that obtainable from the first aspect can be attained.

Figure 23A:
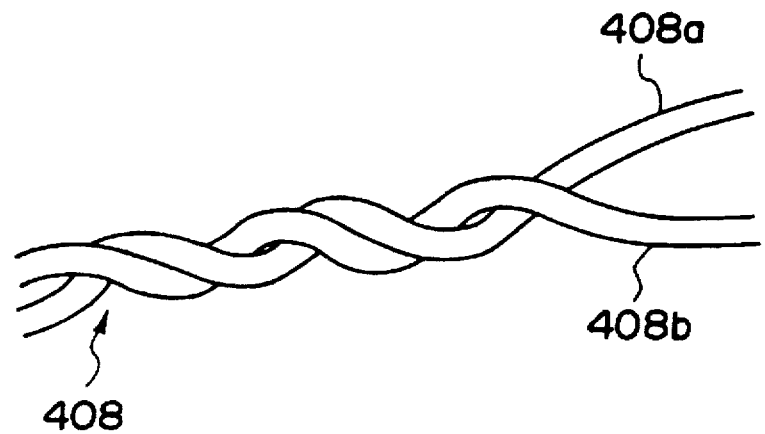
FIGS. 23(A) to 23(C) illustrates a state where the wire is branched.

Although the aforementioned aspect is arranged in such a manner that the two wires are not twined, another structure may be employed in which a structure formed by twining two wires 408a and 408b, as shown in FIG. 23A, is used, it is untied in the predetermined region C, one of the untied wire is arranged around the lens periphery 402a, and the residual untied wire is arranged from the lens periphery 402a to the separation portion 405.

Figure 23B:
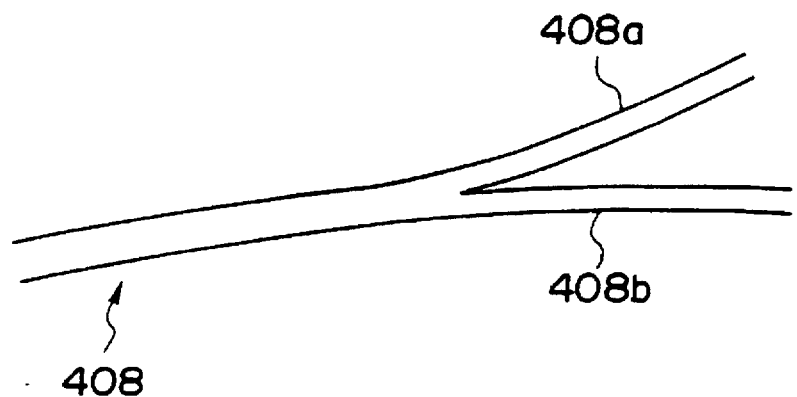

Another structure shown in FIG. 23B may be employed in which the single wire is branched from an intermediate position.

Figure 23C:
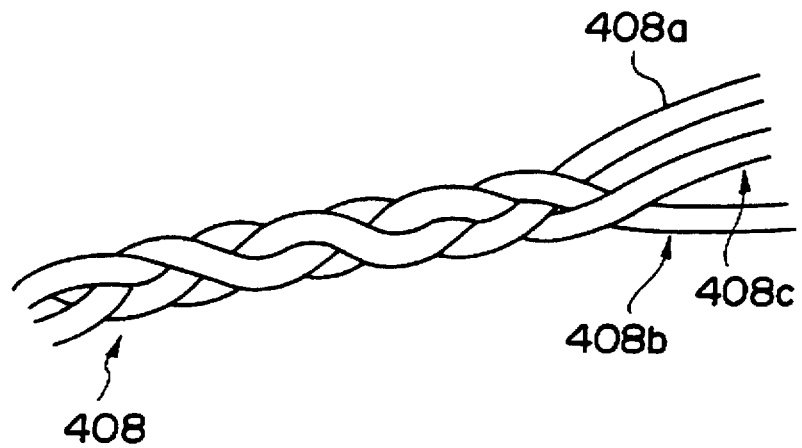

Although the two wires 408 are used in the aforesaid embodiment, the necessity lies in only plural wires 408 are used. For example, there wires 408 may be twined as shown in FIG. 23C. In the case where the three wires 408 are twined, the force for holding the lens 402 can be further enlarged, two wires 408b and 408c are used to be arranged in the predetermined region C, and the decorations 410 can be fastened to the two wires 408b and 408c. Therefore, the design freedom can be further widened.

Although the former embodiment is arranged in such a manner that the distant portion away from the predetermined position 402b of the periphery 402a of the lens 402 is made to be the separation portion 405 of the rim bar 403 slightly projecting over the lens 402 to the side portion, an end portion 403b of the rim bar 403 opposing the separation portion 405 of the rim bar 403 may be made to project to be away from the periphery 402a of the lens 402 so as to constitute the separation portion, and the wire 408b may be arranged between the separation portion and the periphery 402a of the lens 402. That is, it is necessary for a predetermined region of the wire 408b to be positioned away from the periphery 402a of the lens 402.

Therefore, even an arbitrary portion of the bridge 404 or the temple 405, or the surface of the lens 402 or the periphery 402a of the lens may be made to be the separation portion.

The decoration member, which is component of the decoration 410, may be antiques, beads, pearls, glass, or jewels made of various materials formed into a variety of shapes and colors. Therefore, a custom made design in combination with earrings, pierces, a necklace may be made.

As described above, the fourth embodiment of the present invention is arranged in such a manner that the decoration are positioned away from the lens holding member. Therefore, a further improved effect of decoration can be obtained.

In the case where the decorations are positioned away from the lens holding member by making at least a predetermined region of the holding member to be composed of a plurality of wires, the relation between the decorations and the lens holding member can be made further clearly.

Therefore, the effect of decoration can be further improved due to the mutual relationship.

In the case where at least one of a plurality of wires is positioned away from the periphery of the lens by arranging it from the predetermined position of the periphery of the lens to the separation portion, the wire thus arranged exhibits the decorative effect as the decoration.

When other decorations are fastened to the portion of the thus arranged wire, which serves as the decoration, the effect of decoration can be improved.

When one or more wires positioned away from the periphery of the lens are, under tension, arranged between the separation portion and the predetermined position of the periphery of the lens, the shape of the tightened wire exhibits the effect of decoration. Therefore, the effect of decoration can be further improved.

Figure 25:
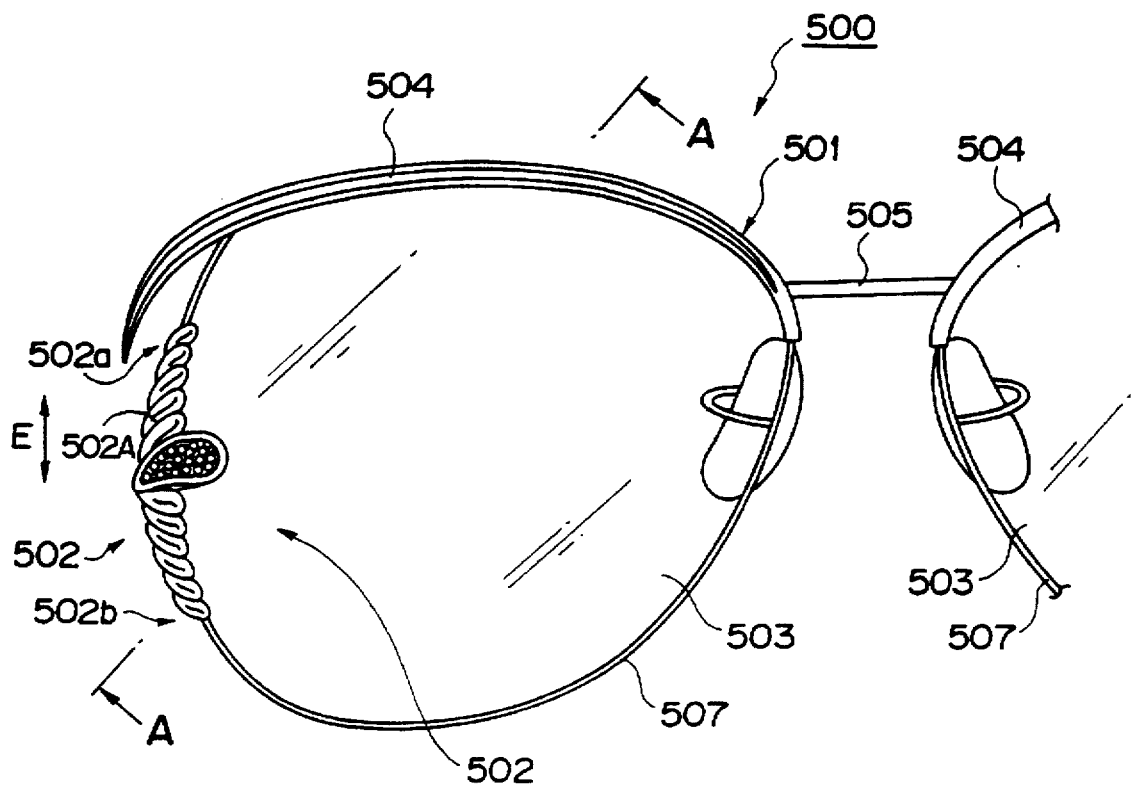
FIGS. 25(A) to 25(C) are views which illustrates a fifth embodiment of spectacles with a decoration according to the present invention.
Figure 25:
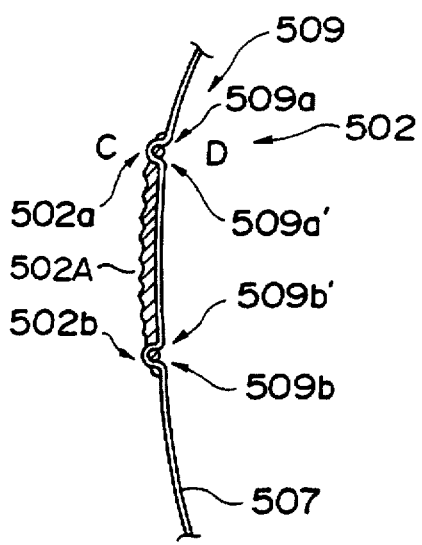
Figure 25:
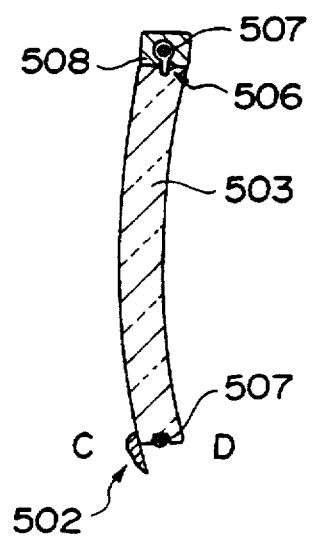

FIGS. 25 and 26 illustrate a fifth embodiment of spectacles with a decoration.

Referring to FIG. 25, reference numeral 500 represents a spectacle body. The spectacles 500 comprise spectacle frame bodies 501 and wires 507 serving as flexible lens holding members for suspending lenses 503 to rim portions 504 of the spectacle frame bodies 501. The wire 507 is made of a fiber thread, such as, a nylon wire, or a metal wire and is arranged around the lens 503. The lens 503 has a groove 506 formed therein around which the wire 507 is wound.

The spectacle frame body 501 is constituted by integrally connecting a pair of the rim bars 504 disposed along the upper portions of a pair of the lenses 503 by a bridge 505. The upper portions of the lenses 503 are secured to the rim bars 504 via connection members 508. The connection member 508 is embedded in a fixing groove 506 formed in the rim bar 504. The end portion of the wire 507 is secured to the rim bar 504 as shown in FIGS. 2A, 9A and 17.

The fifth embodiment is arranged to fasten a decoration having a relatively large size and having two or more fixing support points.

That is, a decoration 502 comprises a decoration member 502A which is formed into a shape elongated in direction E along the wire. Two end portions 502a and 502b of the decoration member 502A in the direction E, respectively, have two fastening holes 509 formed from backside D to the decoration surface C. A wire 507 is inserted from the backside D of the fastening hole 509a to be ejected at the decoration surface C, the wire 507 being then passed through the decoration surface toward another fastening hole 509a' so as to be inserted from the decoration surface C of the other fastening hole 509b toward the backside D. Since the two end portions 502a and 502b of the decoration member 502A are, respectively, fastened to the wire 507 via the fastening holes 509, the decoration member 502A is fastened at the two end portions 502a and 502b thereof.

According to the aforesaid embodiment, thus arranged in such a manner that the wire 507 is inserted into the fastening hole 509, friction force acts between the wire 507 and the decoration member 502A and the decoration member 502A can be fastened to the wire while preventing the movement of the decoration member 502A with respect to the wire 507. Since the two end portions 502a and 502b of the decoration member 502A are secured to the wire 507, even the decoration member 502A elongated in the direction E along the wire 507, can be fastened. Therefore, the range of the decoration member 502A, which can be fastened, is able to be widened, causing the design of the decoration member 502A to be varied.

Since the fastening is performed in such a manner that the wire 507 appears on the surface of the decoration member 502A in a region from the fastening hole 509a to the fastening hole 509a' of the decoration member 502A, the wire 507 exhibits the effect of decoration and therefore the design of the spectacles can be varied.

The positions of the decoration member 502A, at which it is fixed, are not limited to the two end portions 502a and 502b of the decoration member 502A. For example, three or more positions may be fixed.

Other aspects of the fifth embodiment will now be described. The same elements as those according to the first aspect are given the same reference numerals and their descriptions are omitted here.

FIGS. 26A and 26B illustrate a second aspect of the spectacles according to the fifth embodiment of the present invention, in which the structure and the shape of the decoration member 502A are made to be similar to those according to the first aspect except for an arrangement in which the wire 507 is cut at the decoration member 502A. The second aspect of this embodiment is arranged in such a manner that the end portion 507a of the wire 507 is inserted into the two fastening holes 509a and 509a' formed at the end portion of the decoration member 502A similarly to the first aspect. The other aspect of the wire 507 is, similarly, inserted into the two fastening holes 509b and 509b' formed at the other end portion of the decoration member 502A.

That is, the end portion 507a of the wire 507 is secured to the end portion 502a of the decoration member 502A, while the other end portion 507b of the wire 507 is secured to the other end portion 502b of the decoration member 502A. Hence, the decoration member 502A is secured at two or more positions of the wire 507.

Also according to the second aspect, the decoration member 502A are fastened at two positions of the wire 507 similarly to the first aspect, the force for holding the decoration member can be enlarged. Therefore, a decoration, having a relatively large size, can be fastened, causing the range of the size of the decoration member which can be fastened to be widened. As a result, the decoration can be designed more variedly. In addition, two or more positions are fastened, the force for holding the decoration member 502A can be enlarged and therefore the undesirable translation of the decoration member 502A, with respect to the wire, can be prevented. Therefore, strength of fastening can be enlarged.

Since fastening is performed in the state where the wire 507 appears on the surface of the decoration member 502A, the wire 507 exhibits the effect of decoration, causing the design to be performed variously.

In the case where the end portion 507a of the wire 507 is fixed to the end portion of the decoration member 502A and the other end portion 507b of the wire 507 is secured to the other end portion of the decoration member 502A, the lens 503 is held while the decoration member 502A and the wire 507 are made sequential. That is, also the decoration member 502A acts to hold the lens 503 in this case. Therefore, a problem in that the periphery of the lens 503 at which the decoration member 502A is fastened is broken can be protected by the decoration 502.

FIGS. 26C and 26D illustrate a third aspect of a pair of spectacles according to the fifth embodiment of the present invention. The difference from the second aspect lies in that the fastening hole 509, formed at the two end portions of the decoration member 502A, is composed of fastening holes 509a and SO9b, and the end portions 507a and 507b of the other wire 507 have fastening portions 507a' and 507b' having a larger diameter than that of the fastening hole 509.

The fastening portions 507a' and 507b' of the end portions 507a and 507b of the wire 507 inserted into the fastening holes 509a and 509b are fastened on the decoration side of the decoration member 502A. Furthermore, the decoration member 502A are fastened to the two positions of the wire 507. Also according to the third aspect, an effect similar to that obtainable from the second aspect can be obtained.

The decoration member 502A may be fastened to the wire 507 by another method in which the decoration member 502A and the wire 507 are connected by adhesion or by welding in place of the insertion of the wire 507 into the fastening hole 509. Another method may be employed in which the decoration member 502A is fixed by inserting the wire 507 into a through hole formed in the direction E along the wire 507. In addition, the decoration member 502A may be fixed by tying up it with the wire 507. The end portion of the wire 507 may be formed into a hook to catch the decoration member 502A to fix the decoration member 502A. Another method may be employed in which the decoration member 502A may be secured to the wire 507 by a pressing force. A variety of methods may be employed.

The way of arranging the wire 507 around the lens 503 is not limited to the way in which the groove 506 is formed in the lens 503 and the wire 507 is arranged into the groove 506 of the lens 503. Another method may be employed in which the groove 506 in the lens 503 is omitted and a groove which is able to receive the lens may be formed in a wide wire.

As described above, according to the fifth embodiment, the decoration are supported at two or more positions, causing the force for holding the decoration to be enlarged. Therefore, a relatively large decoration can be fastened and, therefore, a variety of decorations may be fastened, causing the design to be performed more freely. The structure in which two, or more, fastening positions are used, the force for holding the decoration can be enlarged and the undesirable movement of the decoration with respect to the holding member can be prevented. Hence, the fastening strength can be increased.

When the fastening is performed in the state where the holding member appears on the decoration surface of the decoration, the holding member exhibits the effect of decoration and the design can be performed more freely.

In the case where the end portion of the holding member is secured to the end portion of the decoration and the other end portion of the holding member is secured to the other end portion of the decoration, also the decoration acts to hold the lens. Therefore, the breakage of the periphery of the lens at the position at which the decoration is fastened, due to undesirable outer force, can be prevented for the presence of the decoration.

FIGS. 27 to 30 illustrate a sixth embodiment of spectacles according to the present invention, wherein this embodiment disclose an exchangeable decorative wire assembly comprising a decoration and flexible lens holding member. FIG. 27 illustrates a first aspect. Referring to FIG. 27A, reference numeral 601 represents a spectacle frame body which comprises arc-type rim bars 603 individually disposed along the upper portion of a pair of lenses 602. The rim bars 603 are connected to each other on their inside portions by a bridge 604.

A hinge 605 is fixed to the outside of the rim bar 603, and a temple 605 is connected to the hinge 605 in such a manner that the temple 605 is able to be opened or closed.

Figure 27A:
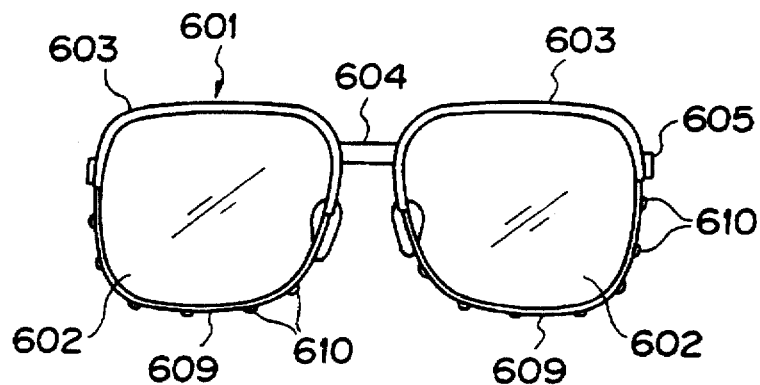
FIGS. 27(A) to 27(D) are views which illustrates a sixth embodiment of spectacles with a decoration according to the present invention.
Figure 27B:
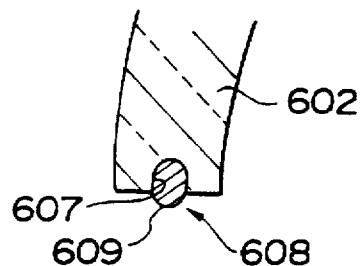
Figure 27C:
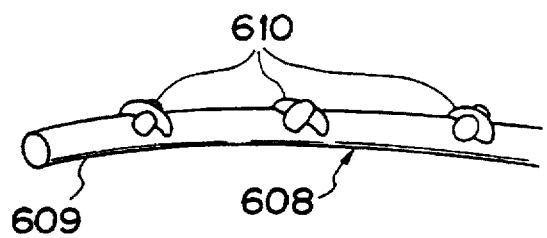
Figure 27D:
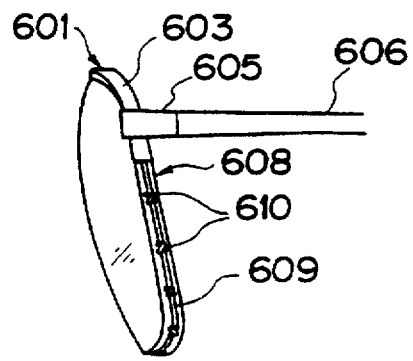

As shown in FIG. 27B, the lens 602 has a groove 607, formed on the outer surface thereof, and a flexible decorative wire assembly 608 is received by the groove 607 so that the lens 602 is held. The decorative wire assembly 608 is arranged along the lower portion of the lens 602 and comprises a flexible lens holding member 609 serving as a wire formed to have a substantially circular cross sectional shape.

The two end portions of the lens holding member 609 are inserted into hole (omitted from illustration) formed at the two end portions of the rim bar 603 so as to be fixed there so that the lens holding member 609 has a predetermined tension.

A plurality of decorations are provided for the surface of the lens holding member 609. The decorations 610 according to this embodiment project over, or become hollow under, the surface of the lens holding member 609. The decoration 610 may be formed by integrally formed with the lens holding member 609 or the same may be formed by bonding or fusing an individual decoration made of metal or plastic to the 609 or by fastening and fixing the same into a hole (omitted from illustration) formed in the lens holding member 609. Furthermore, the line, figure and color may be applied on the surface of the lens holding member 609 as a decoration 610.

The number and the shape of the decorations 610 may be arbitrarily determined and the decorations 610 may have different shapes.

In addition, the lens holding member 609, of course, directs the decoration 610 outwardly when it is received by the groove 607.

As described above, the decorations 610 are formed in the lens holding member 609 which forms the decorative wire assembly 608, so that the thin lens holding member 609 to be received by a frame having a groove can be made decorative. Since the decorations 610 are formed on the lens holding member 609, the decorations 610 can be held by large force. Therefore, even if outer force acts on the decorative wire assembly 608 after the decorative wire assembly 608 or the spectacle frame body 601 in a single state has been assembled, the positional deviation, or separation of, the decorations 610 with respect to the decorative wire assembly 608 can be prevented. Hence, an excellent decorative function can be exhibited for a long time. The wire may be made of plastic of another type such as cellulose polypropyrene, and polystyrene or made of metal wire.

Figure 28A:
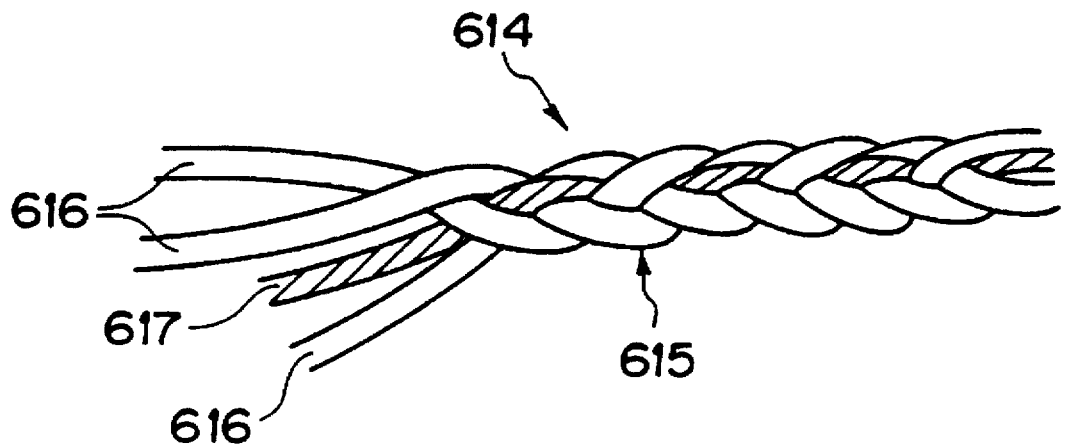

FIG. 28A illustrates a second decorative wire assembly 614 according a second aspect of the sixth embodiment. A flexible lens holding member 615 serving as the second decorative wire assembly 614 is formed by braiding a plurality, that is, three nylon threads 616 are braided according to this aspect in such a manner that a decoration 617 is included by braiding between the nylon thread 616.

Figure 28B:
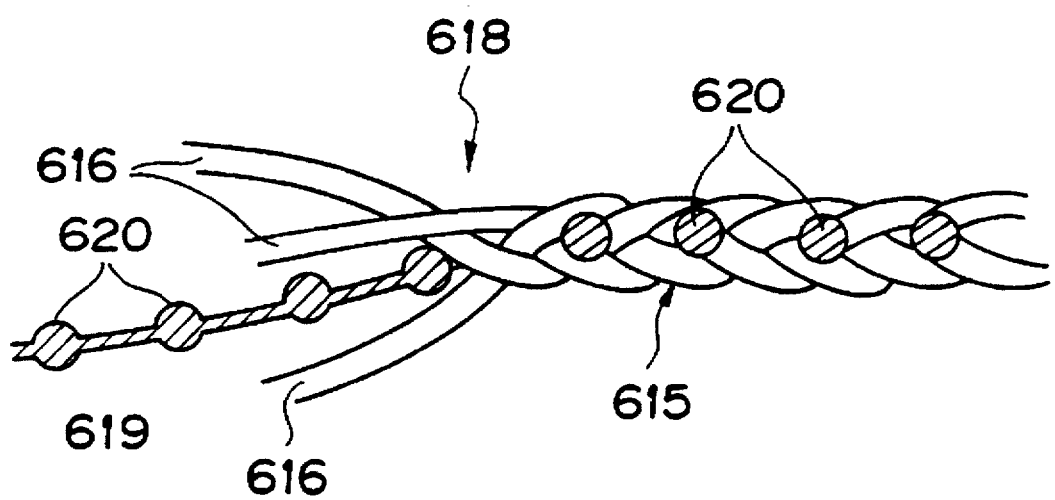

The decoration 617 is a wire which is the same as the nylon thread 616 but which is made of plastic or metal having a color different from that of the nylon thread 616. FIG. 28B illustrates a second decorative wire assembly 618 according to a third aspect of the sixth embodiment. This aspect is arranged similarly to the second aspect except for the decoration 619. The decoration 619 has a plurality of ball elements 620 disposed at predetermined intervals, the ball elements 620 being braided so as to be included into the nylon thread 616 in such a manner that the ball elements 610 are positioned on the same surface of the second decorative wire assembly 618. The decoration 619 is made of the aforesaid metal or plastic.

Also the decorative wire assembly 614 and 618, respectively, according to the second and the third aspects are, similarly to the first aspect, received by the groove formed in the lens 602. The two end portions of the decorative wire assembly 614 and 618 are connected to the rim bars 603. Hence, an effect similar to that obtainable from the first aspect can be attained from the second and the third aspects.

Since the second and the third aspects are respectively arranged in such a manner that the decorations 617 or 620 is, by braiding, included by the nylon thread 616, a peculiar pattern can be realized in cooperation of the nylon thread 616 and the decoration 617 or 620, causing a further excellent effect of decoration to be obtained.

The second and the third aspects may be arranged in such a manner that metal wires are, in place of the nylon threads, braided to form the wire and the nylon decoration is, by braiding, included by the wire thus formed.

Figure 29A:
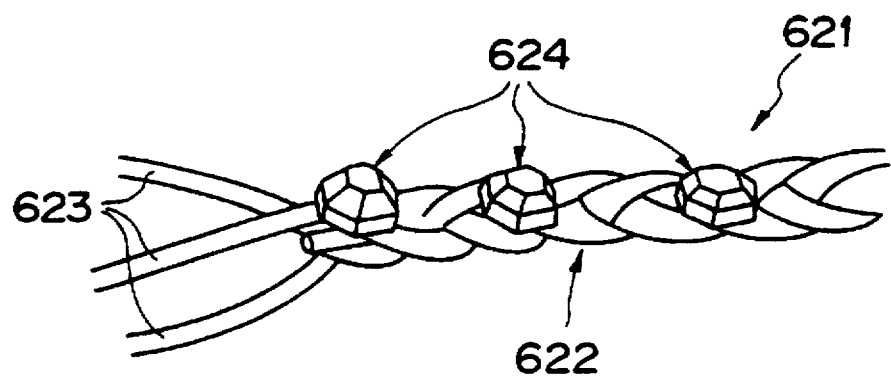
Figure 29B:
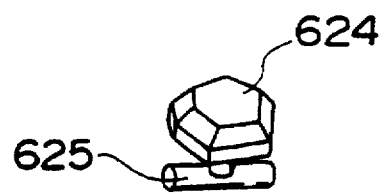

FIG. 29A illustrates a second decorative wire assembly 621 according to a fourth aspect. The second decorative wire assembly 621 has a lens holding member 622 which is formed by braiding three nylon threads 623. Furthermore, decorations 624 are, as the decorations, secured between the nylon threads 623.

The decoration 624 is made of plastic, metal or glass and having, on the bottom thereof, a fastening portion 625 formed into an inverted-T shape. The fastening portion 625 is held between the nylon threads 623 so that the decoration 624 is secured to the wire 622.

Figure 29C:
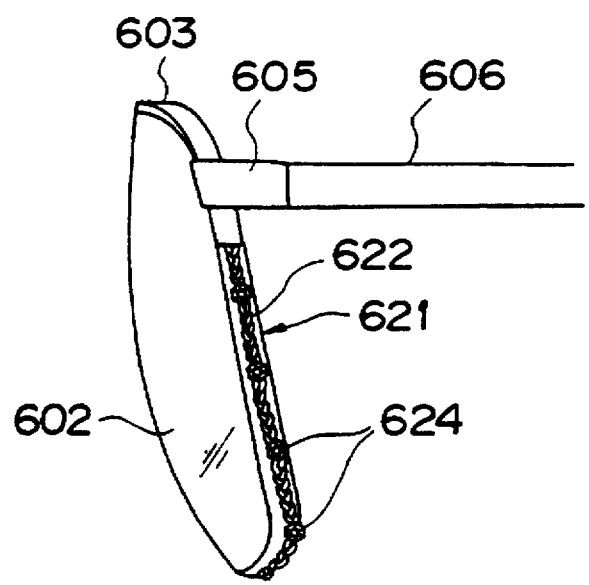

The second decorative wire assembly 621 is, as shown in FIG. 29C, received by the groove 603 of the lens 602 and is, at the two end portions thereof, connected to the rim bars 603.

Therefore, an effect, similar to that obtainable from the first aspect, can be attained.

Furthermore, a further excellent effect of decoration can be attained due to the cooperation of the braid pattern of the nylon threads 623 and the decorations 624.

The fourth aspect may be arranged in such a manner that metal wires are, in place of the nylon threads, braided to form the wire.

FIG. 30A illustrates a second decorative wire assembly 626 according to a fifth aspect. A lens holding member 627 for is formed by braiding three nylon threads 628. According to this aspect, the braid pattern of the nylon threads 628 acts as a decoration 629.

The second decorative wire assembly 626, thus constituted, is received by the groove of the lens 602 as shown in FIG. 30B and the two end portions of the second decorative wire assembly 626 are connected to the rim bars 603.

Therefore, an effect, similar to that obtainable from the first aspect, can be attained. If the colors of the three nylon threads 628 are made different from one another, the effect of decoration can be further improved. The wire may be formed by braiding metal wires in place of the nylon wires.

Although three nylon threads or metal wires are braided to form the lens holding member according to the second to the fifth aspects, two or four or more wires may be used.

When the lens holding member is formed by braiding a plurality of nylon threads, as employed in the second to the fifth aspects, the flexibility of the lens holding member in the elongation/contraction direction can be improved. Therefore, even if external force, such vibrations, is applied to the rim bar, the friction resistance generated due to the elongation/contraction of the nylon threads acts to absorb and relax the external force. Hence, an excellent lens protection function can be realized.

In the case where the lens holding member is formed by braiding a plurality of nylon threads, as performed in the second to the fifth aspects, the enlargement of the bonding force of the nylon threads by heating and welding the end portions of the same will prevent the undesirable separation of the end portions.

The sixth embodiment can be adapted to a spectacle frame having no rim bars, that is, a spectacle frame arranged in such a manner that the decorative wire assembly is wound around the lens, the hinge is formed by a branched type hinge, and the bridge is directly connected to the decorative wire assembly wherein the decorative wire assembly is inserted into holes formed in the branched hinge and the bridge. Since the decorative wire assembly and the decoration are integrally formed, as described above, the process required to fasten the decoration can be omitted. Furthermore, the deviation and separation of the decoration can be prevented and therefore an excellent effect of decoration can be exhibited for a long time.

FIGS. 31 to 38 illustrate a seventh embodiment of the present invention.

FIG. 31A is a front elevational view which illustrates a first aspect of the seventh embodiment of the present invention. That is, metal rim bars 702, formed into arcs, are disposed at the upper portions of a pair of lenses 701, the rim bars 702 being connected to each other by a brace bar 703 and a bridge 704. The lens has a groove 705, formed in the outer surface thereof, the groove 705 receiving a wire 706, such as, a metal wire or a nylon wire. The end portions of the wire 706 are secured to a portion of the rim bar 702.

Reference numeral 707 represents a decoration. The decoration comprises a decoration member 707a fastened to the wire 706, the decoration member 707a having a recess 708 formed as shown in FIG. 31C on the reverse side thereof. A fastening member 709 is connected to a portion in the recess 708. Although the decoration member 707a may be made of metal, plastic or cloisonne, it is preferable that the fastening portion 709 may be made of metal so as to maintain a predetermined rigidity even after it has been plastically deformed. The fastening member 709 is formed into a substantially cylindrical shape having a cut portion 710 formed partially and has a plurality of fastening members 711 while interposing the cut portion 710. The width of the cut portion 710 is set to a value which enable the wire 706 to pass through.

Figure 31:
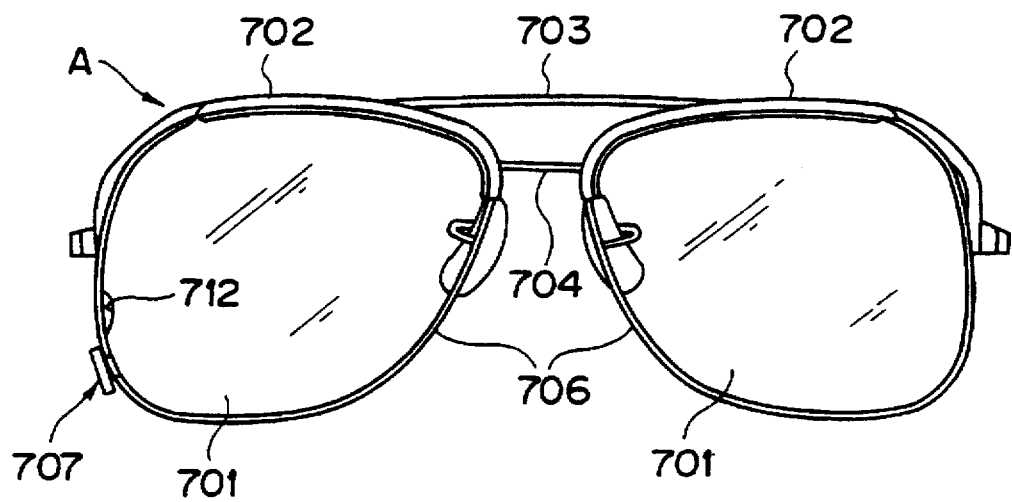
FIGS. 31(A) to 31(D) are views which illustrates a seventh embodiment of spectacles with a decoration according to the present invention.
Figure 31B:
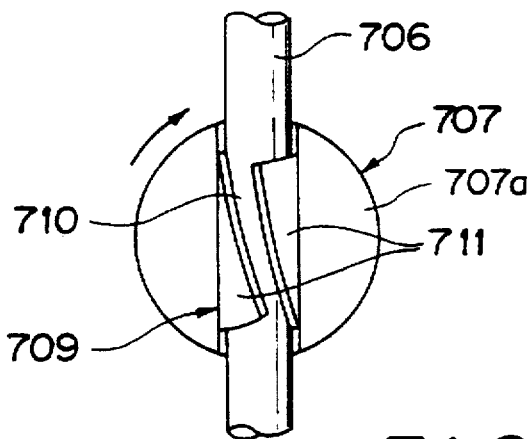
Figure 31C:
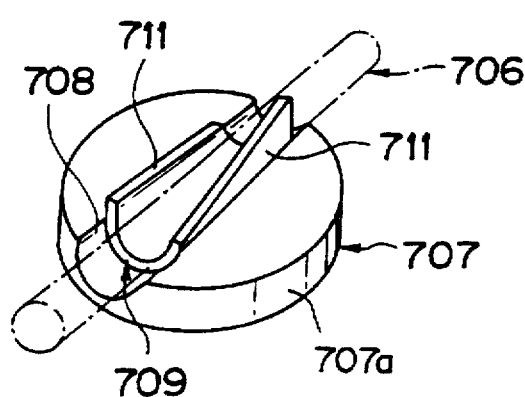
Figure 31D:
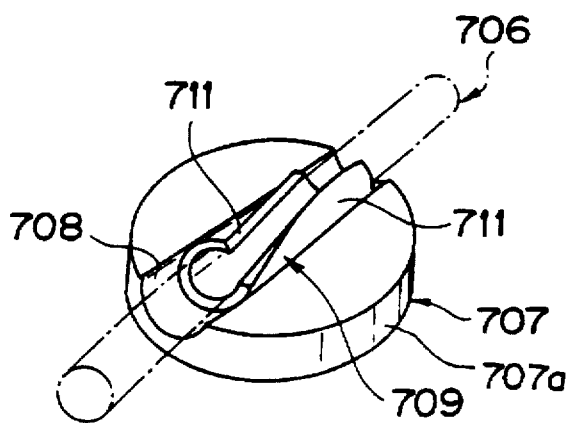

The center line (omitted from illustration) of the cut portion 710 makes a predetermined angle from the center line (omitted from illustration) of the wire 706 and run parallel to each other (see FIG. 31B).

The decoration member 707a is fastened to the wire 706 as follows: the fastening member 711 is disposed substantially vertically with respect to the reverse side of the decoration member 707a as shown in FIG. 31C. The decoration member 707a is brought closer to a cut portion 712 formed at the edge of the lens 701 and as well as the wire 706 is inserted into the fastening member 709.

Then, the decoration member 707a is located along the wire 706 and it is fixed by plastic deformation by applying pressure similarly to the fastening member 711. Further, the decoration 707 may be fastened by according the center of the cut portion 710 with the center line of the wire 706 after the preliminary deformation of the decoration 707 and twisting the wire 706 in the counterclockwise direction after the insertion thereof into the fastening member 709. The decoration member 707a, thus-fixed, is in a state where the fastening member 711 is held between the wire 706 and the lens 701. Furthermore, the center lines of the cut portion 710 and the wire 706 do not run parallel to each other. Hence, even if the decoration member 707a is pulled upwards when viewed in FIG. 32A, the fastening member 711 is received by the wire 706 and therefore they are not separated from each other.

The decoration 707a can be removed from spectacle A by clockwisely twisting the decoration member 707a, as shown in FIG. 31B, to make the center lines of the wire 706 and the cut portion 710 substantially coincide with each other before pulling the lens 701 in the separation direction. Thus, the wire 706 can be removed from the cut portion 710. Therefore, the decoration member 707a can be attached or detached while maintaining the lens 701, causing an effect to be obtained in that a demonstration can easily be performed.

FIGS. 33A and 33B illustrate another method for fixing the fastening member 711 by applying pressure. That is, the curvature of the groove 705 is made larger than that of the wire 706 so that the fastening member 711 is plastically deformed in accordance with the shape of the groove 705 when the fastening member 711 is pressed to the groove 705. Thus, the press fixing process can be omitted and an excellent operation efficiency can be realized.

Another method may be employed in which the fastening member 709 is made of a Ni-Ti shape memory alloy so as to bend the fastening member 711 by the transformation of the shape memory alloy.

Another method may be employed in which the cut portion is not formed in the lens 712, the tension of the wire 706 is weakened, and a proper position of the wire 706 is outwards pulled so that the decoration member 707a is fastened.

Furthermore, the state where the decoration member 707a is fastened to the cut portion 712 may be maintained.

Figure 34:
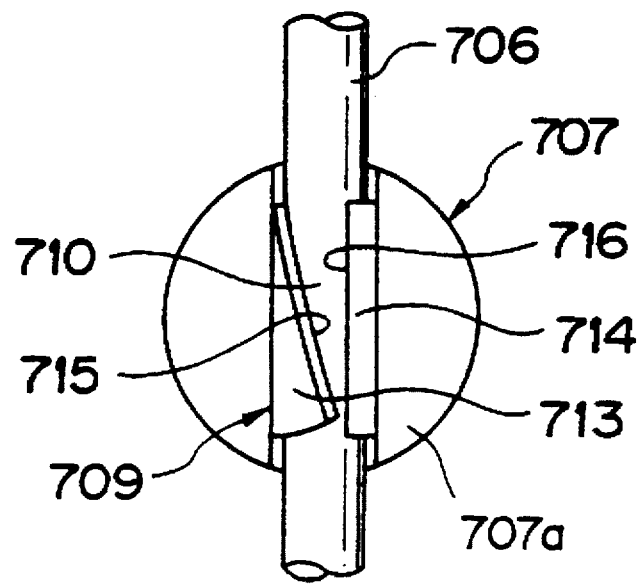
FIGS. 34, 35, 36(A), 36(B), 37(A) to 37(C) and 38(A) to 38(C) illustrate a variety of structures for fastening the decoration according to the seventh embodiment.

FIG. 34 illustrates a second aspect of the seventh embodiment. The cut portion 710 is formed in the fastening member 709 which has separation prevention members 713 and 714 for covering the cut portion 710. An edge 716 of the separation prevention member 714 runs parallel to the center line of the wire 706, while the other separation prevention member 713 has an edge 715 inclined with respect to the center line. According to the second aspect, the fastening member 709 can be secured to the wire 706 by press-fixing only the separation prevention member 713. The other structure and effect are similar to those according to the first aspect.

Figure 35:
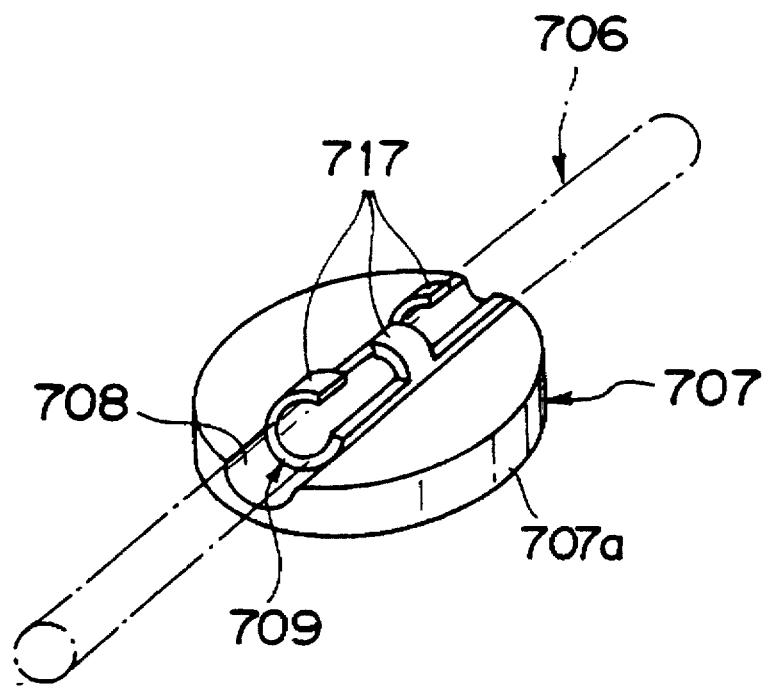

FIG. 35 illustrates a third aspect of the seventh embodiment. The third aspect is arranged in such a manner that separation prevention member 717 are alternately disposed while interposing the cut portion 710. Also according to the third aspect, an effect similar to that obtainable from the first aspect can be achieved.

Figure 36A:
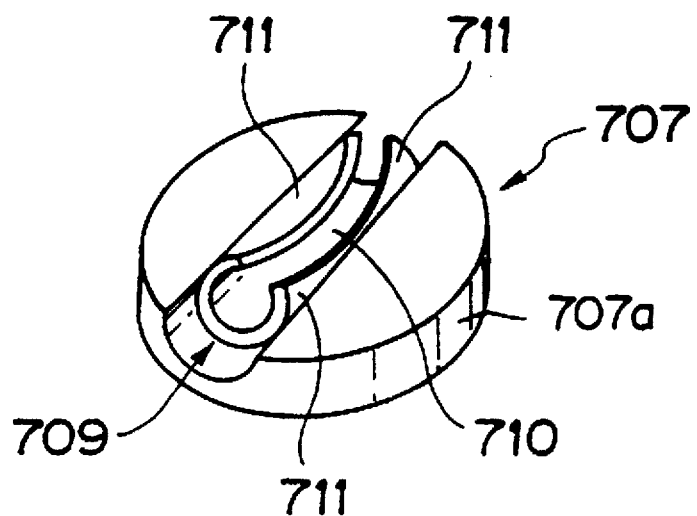
Figure 36B:
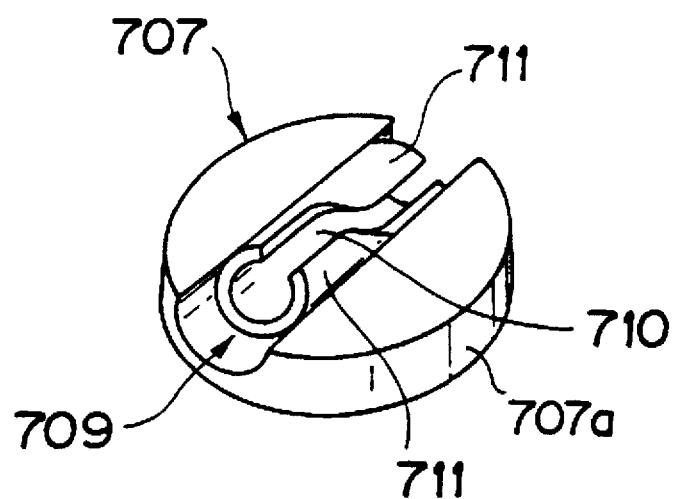

FIG. 36A illustrates a fourth aspect of the seventh embodiment, in which edges of a pair of fastening members 711 facing each other are bent so that a bent cut portion 710 is formed. The other structure and effect are similar to those according to the first aspect.

Figure 37A:
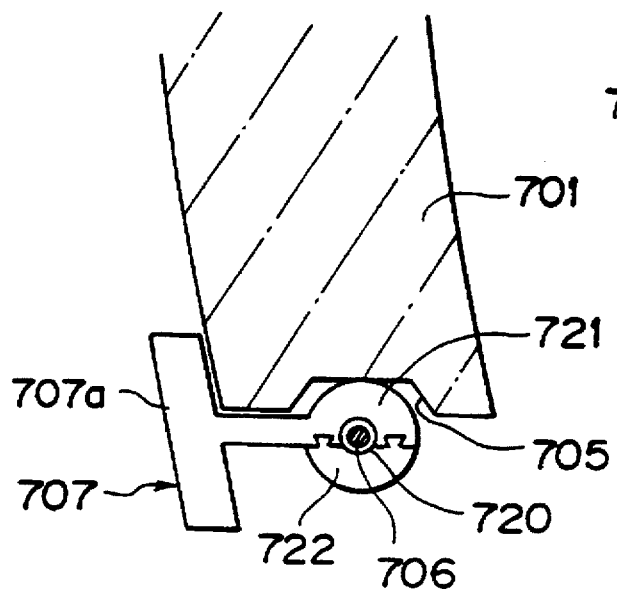
Figure 37B:
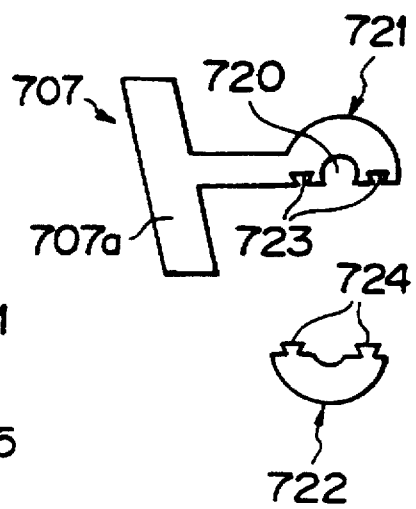
Figure 37C:
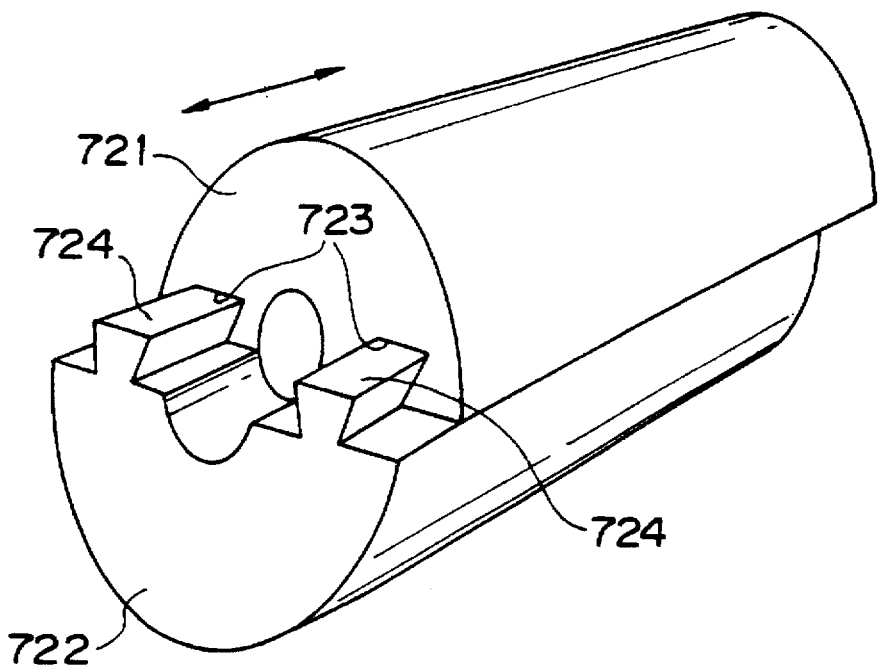

FIGS. 37A, 37B and 37C illustrate a sixth aspect, in which a fastening member 721 for holding the wire 706 is formed into a circular arc shape and has a cut portion 720. The cut portion 720 has a width which enables the wire 706 to pass through. Reference numeral 722 represents a separation prevention member for covering the cut portion 720, the separation prevention member 722 being also formed into the circular arc shape. The fastening member 721 and the separation prevention member 722 are equivalent to a structure obtained by dividing a cylinder in its axial direction.

A dovetail groove 723 and a dovetail 724 are formed in the abutment surface on which the fastening member 721 and the separation prevention member 722 are abutted against each other. Therefore, the holding member 721 and the separation prevention member 722 are able to relatively slide along the dovetail groove 723 and the dovetail 724 as shown in FIG. 37C.

The decoration member 707a can be fastened to the spectacles in the aforesaid structure by inserting the holding portion 721 between the wire 706 and the lens 701 and by holding the holding portion 721 by the lens 701 and the wire 706.

Then, the separation prevention member 722 is slid while inserting the dovetail 724 of the separation prevention member 722 into the dovetail groove 723, so that the fixing process is completed. Since the separation prevention member 722 covers the cut portion 702 in this state, large fixing force can be obtained. Therefore, even if the decoration member 707a is rotated by 180° relative to the wire 706 from a state shown in FIG. 37A, the decoration member 707a cannot be separated.

The decoration member 707a can be removed by performing the aforesaid operation in an inverted manner. Therefore, an effect similar to that obtainable from the first aspect can be obtained.

Figure 38A:
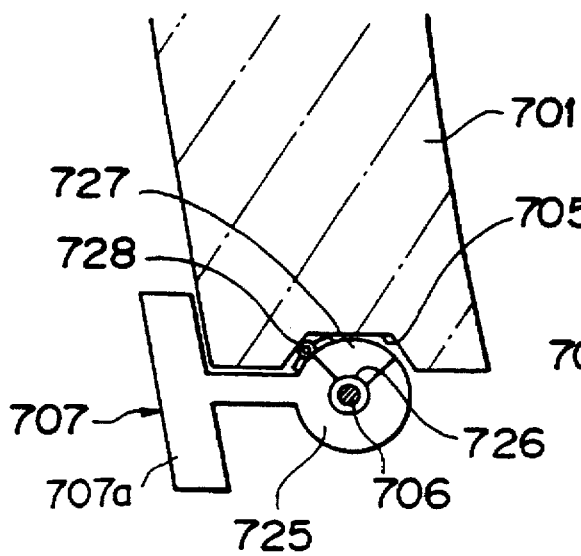
Figure 38B:
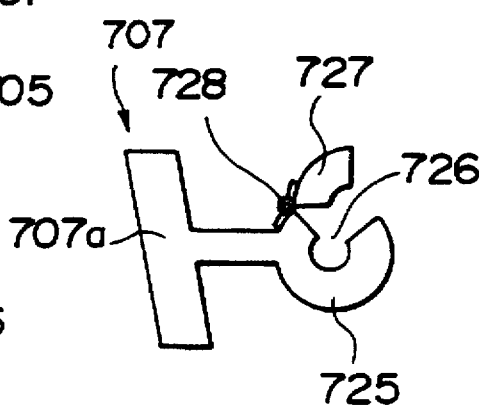
Figure 38C:
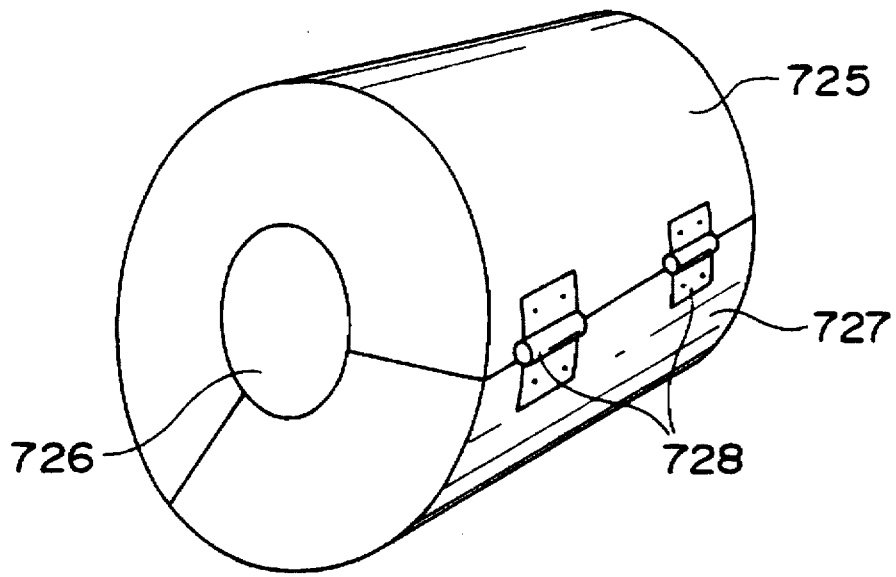
Figure 39A:
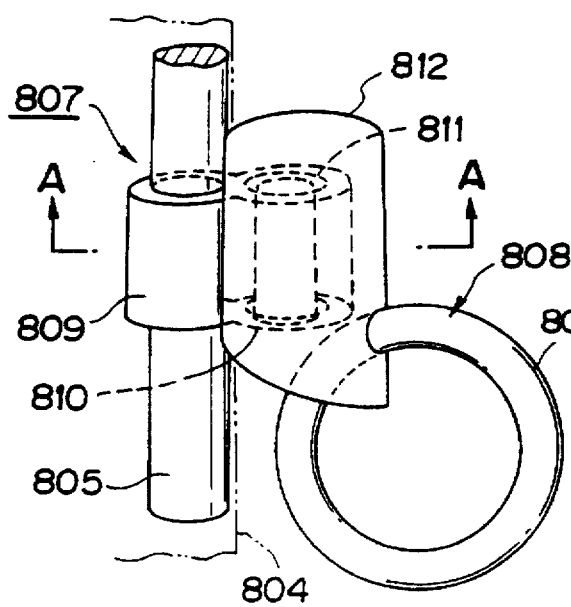
FIG. 39(A) is a perspective view which illustrates a portion for fitting the decoration.
Figure 39C:
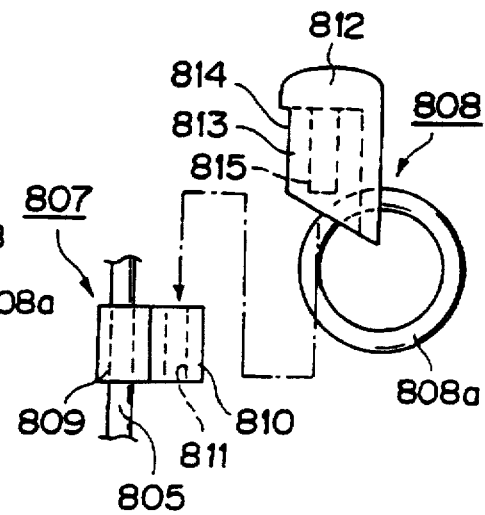
FIG. 39(C) is a front elevational exploded view which illustrates the fitting portion of the decoration of FIG. 39(A)
Figure 39B:
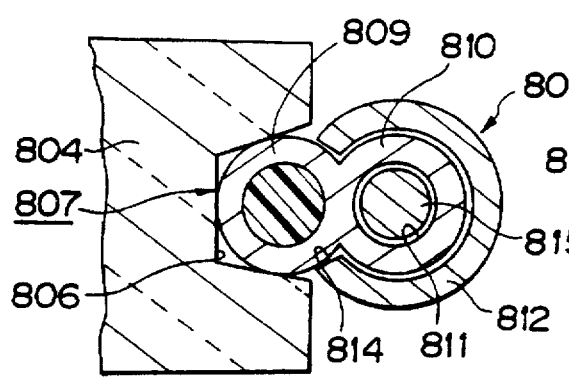
FIG. 39(B) is a cross sectional view taken along line XXXIX—XXXIX of FIG. 39(A)
Figures 39D, 39E:
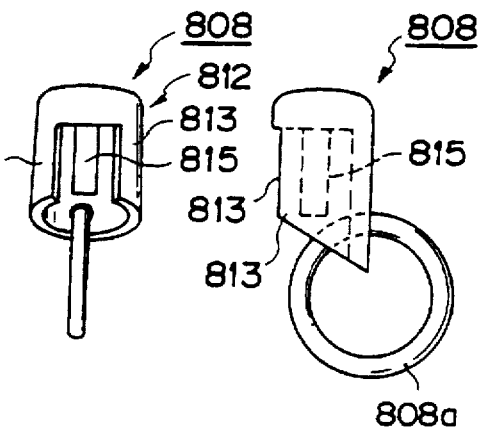
FIG. 39(D) is a front elevational view which illustrates attachment of the decoration of FIG. 39.
FIG. 39(E) is a side elevational view which illustrates the attachment of FIG. 39(A)
Figure 39F:
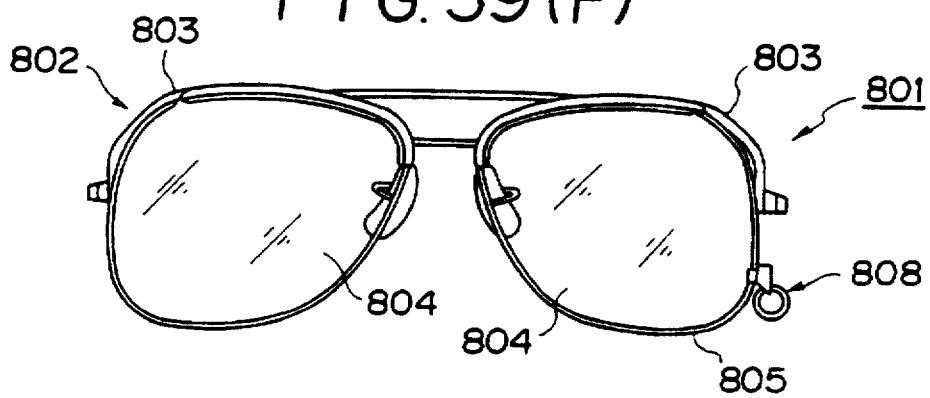
FIG. 39(F) is an overall view which illustrates the spectacles of FIG. 39(A)
Figure 41A:
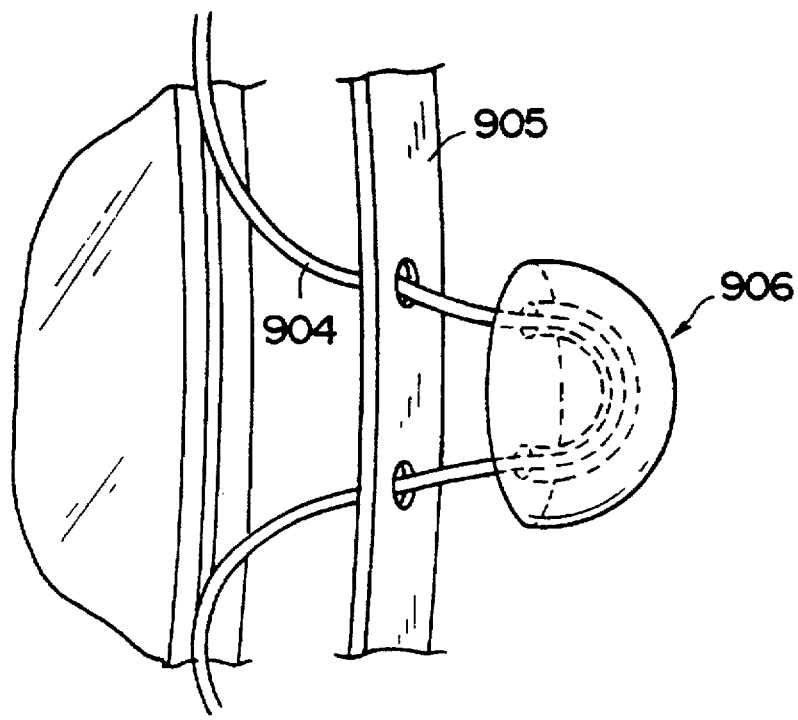
FIGS. 41(A) to 41(C), 42, 43(A), 43(B), 44(A) to 44(C), 45(A) to 45(C), 46(A) and 46(B), 47(A) to 47(C) and 48(A) to 48(D) are views representing a ninth embodiment including various aspects therefor, in which the decoration is attached to the end portion of the wire as lens holding member.
Figure 41B:
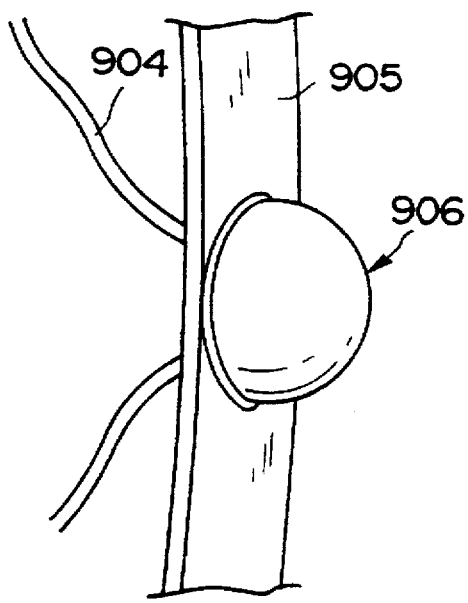
Figure 41C:
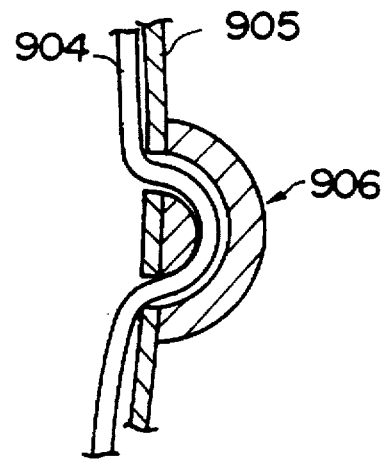
Figure 42:
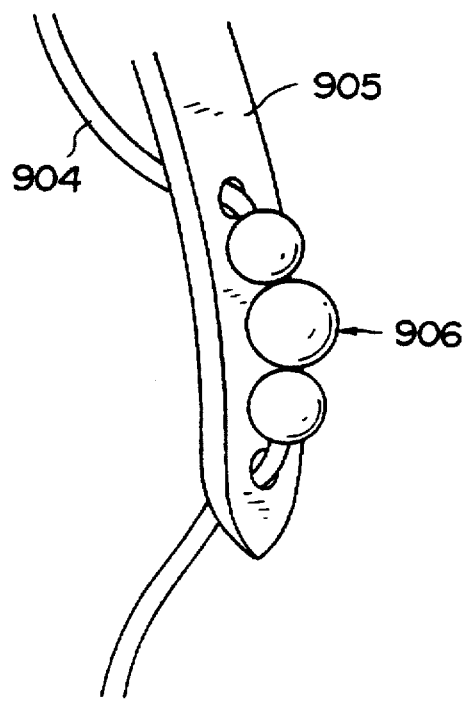
Figure 43A:
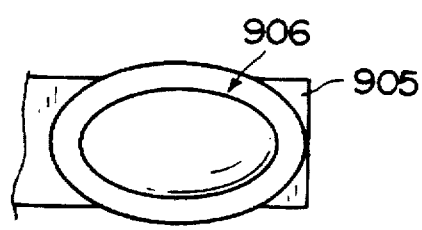
Figure 43B:
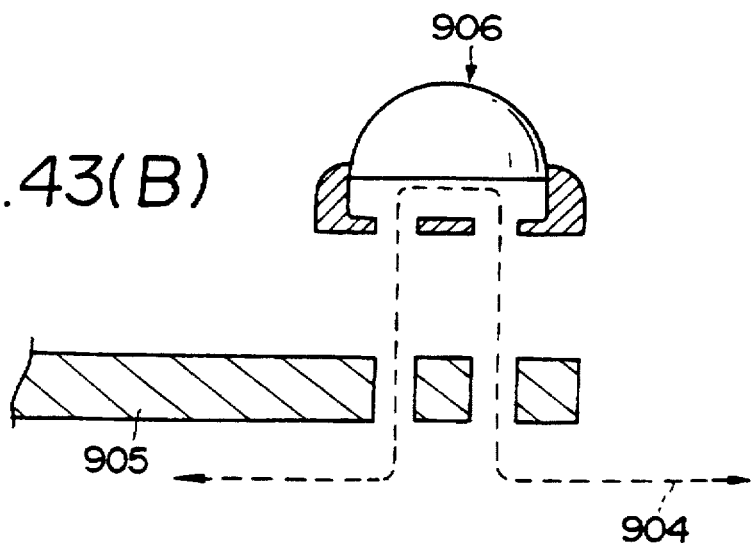
Figure 44A:
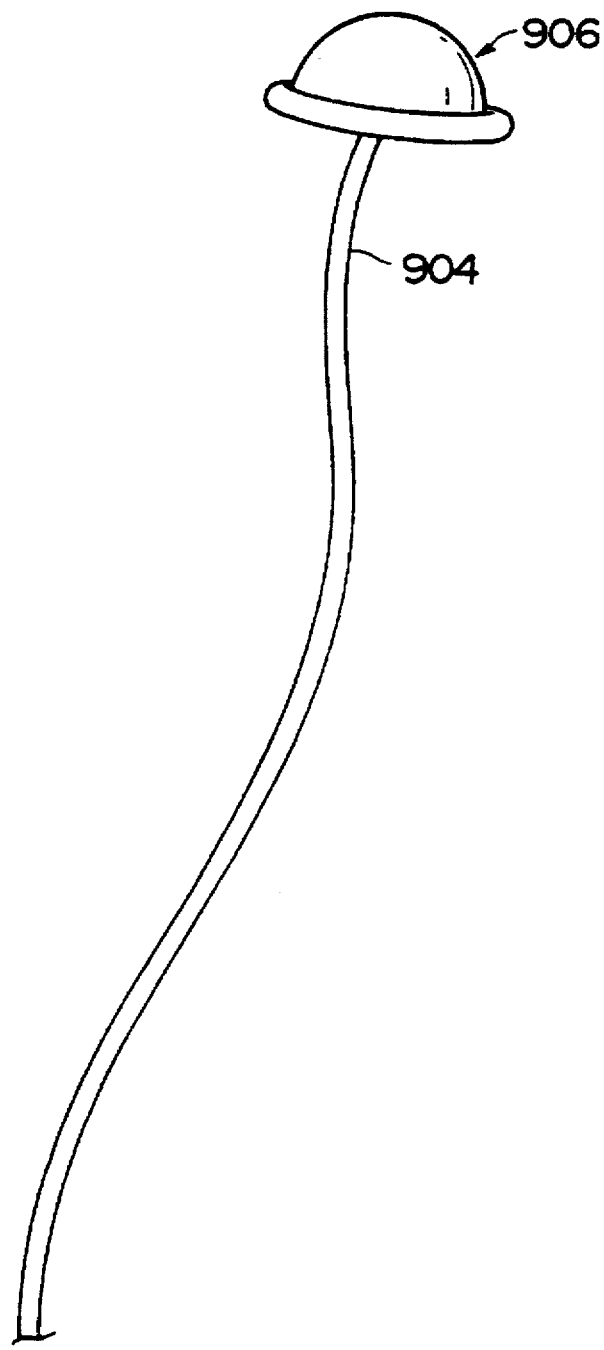
Figure 44B:
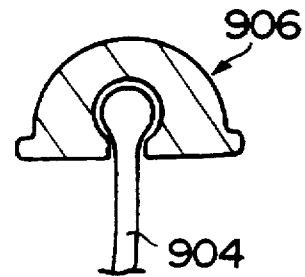
Figure 44C:
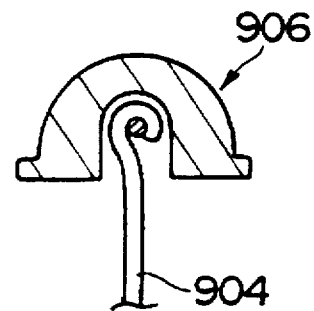
Figure 45A:
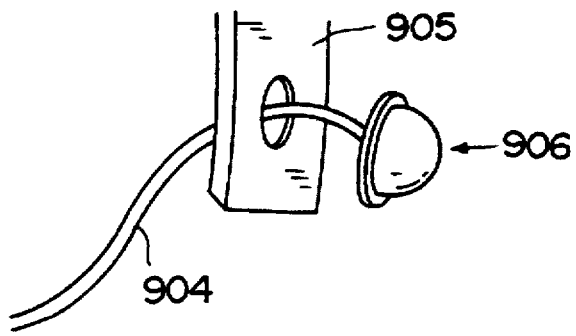
Figure 45B:
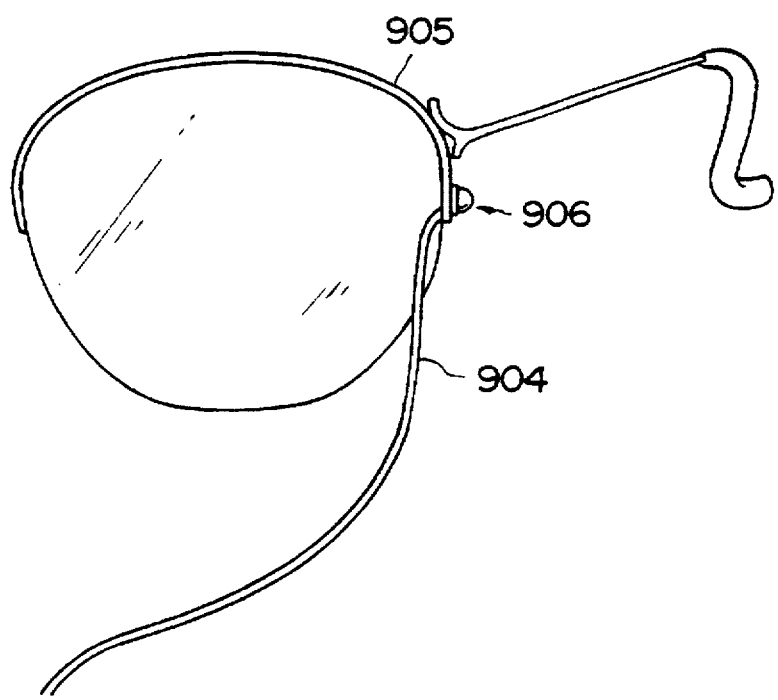
Figure 45C:
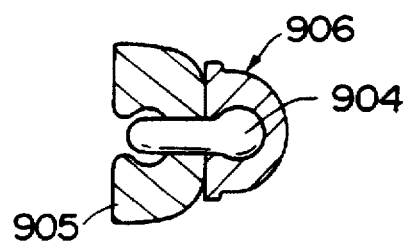
Figure 46A:
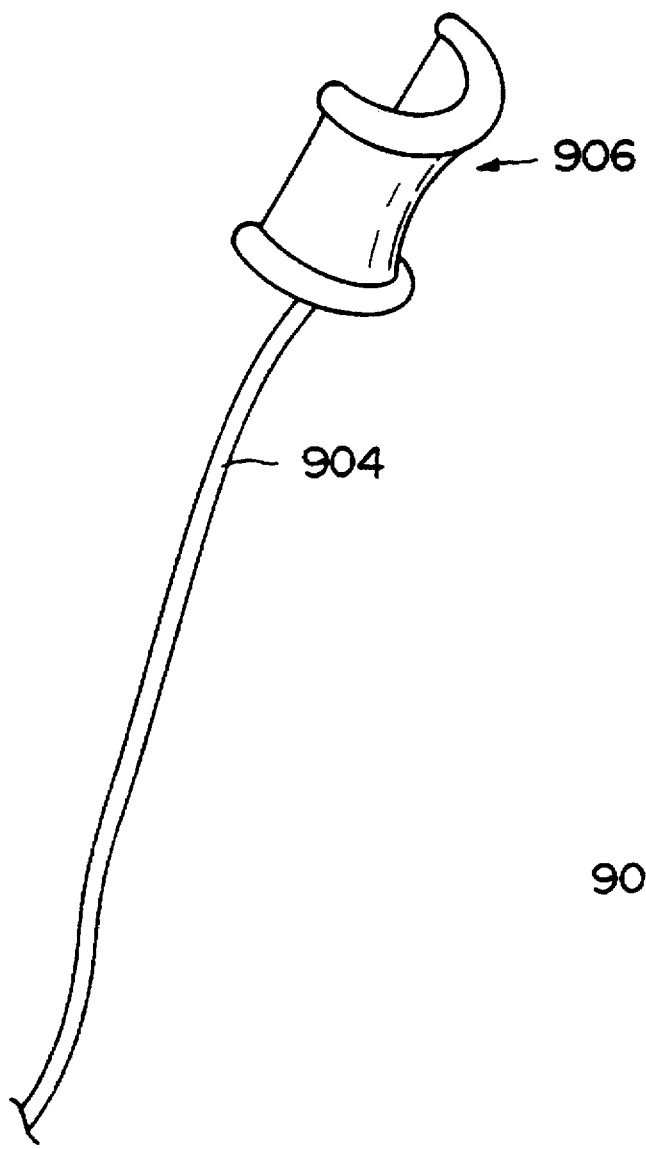
Figure 46B:
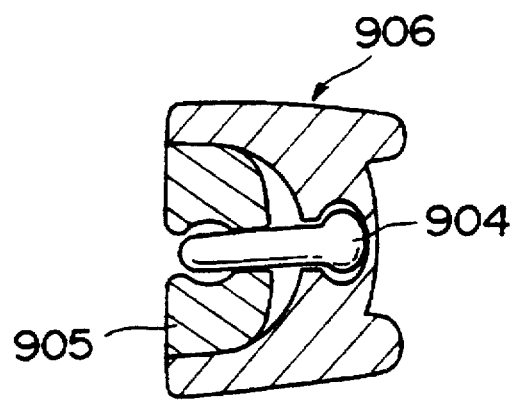
Figure 47A:
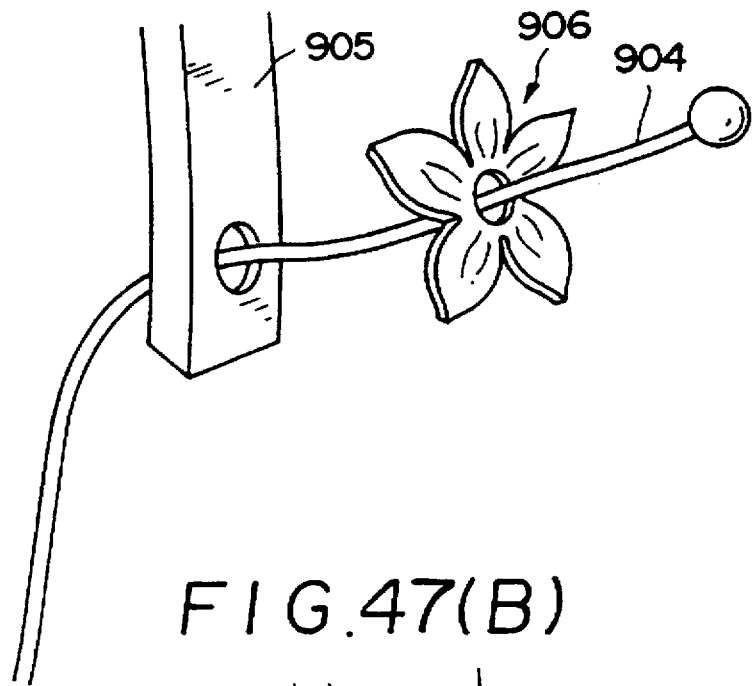
Figure 47B:
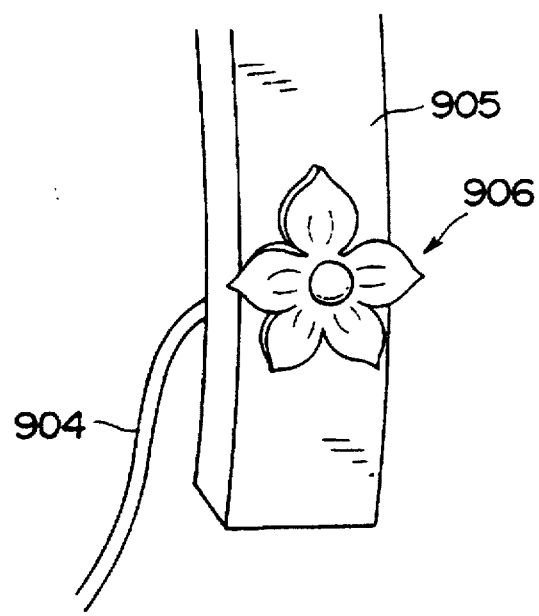
Figure 47C:
Figure 48A:
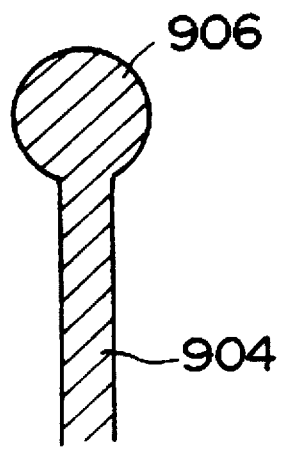
Figure 48B:
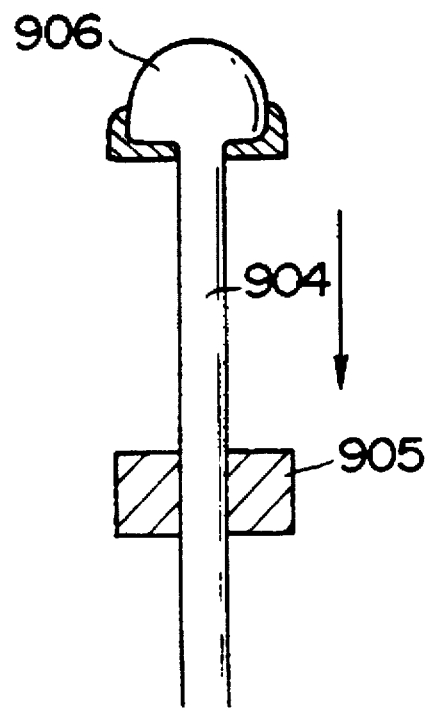
Figure 48C:
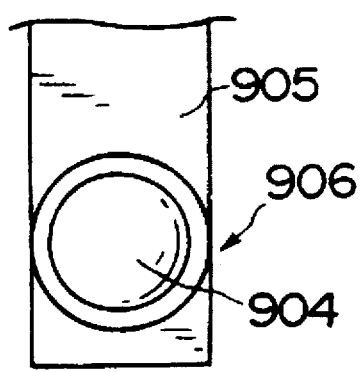
Figure 48D:
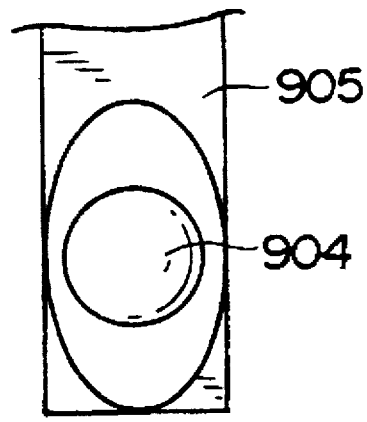

FIGS. 38A, 38B and 38C illustrate a seventh aspect. A fastening member 725 for holding the wire 706 is formed into a circular arc and has a cut portion 726 formed along its axial direction. The cut portion 726 has a width which enables the wire 706 to pass through the cut portion 726. Reference numeral 727 represents a separation prevention member for covering the cut portion 726, the separation prevention member 727 being also formed into a circular arc shape. The circumference of the fastening member 725 is longer than the circumference of the separation prevention member 727. The fastening member 725 and the separation prevention member 727 are equivalent to the structure obtained by dividing a cylinder into two sections.

The fastening member 725 and the separation prevention member 727 are connected to each other by a hinge 728 in such a manner that they are able to be opened and closed.

In such structure, the decoration 707 can be fastened to the spectacles by opening the separation prevention member 727, by inserting the fastening member 725 between the wire 706 and the lens 701, and by clockwise rotating the fastening member 725, when viewed in FIG. 38, so as to move the fastening member 725 between the lens 701 and the wire 706 so that it is held between them and fixed.

When the fastening member 725 and the separation prevention member 727 are integrally rotated counterclockwise when viewed in FIG. 38, while closing the cut portion 726 by the separation prevention member 727, they are stopped at the position shown in FIG. 38A, that is, they are stopped at the moment when the separation prevention member 727 is held between the wire 706 and the lens and as well as the decoration member 707a comes in contact with the lens 701.

Since the decoration member 707a is positioned in contact with the lens 701 in this state, the fastening member 725 cannot be opened by using the hinge 728 and, therefore, the cut portion 726 is shielded. Even if the separation prevention member 727 is opened after the decoration member 707a is counterclockwisely rotated by 180° relative to the wire 706, when viewed in FIG. 37A from the state shown in FIG. 37A, the separation of the decoration member 707a can be prevented because the fastening member 725 is held between the wire 706 and the lens 701. Therefore, an effect similar to that obtainable from the first aspect can be attained. The decoration 707 can be removed by the operation performed in an inverted manner.

Although the aforesaid aspects are adapted to the spectacles having the frame in which the groove is formed, another structure may be employed in which the groove is not formed in the lens, an elongated and flexible wire is wound around the lens, and a decoration member of the aforesaid type is fastened to the wire.

According to the seventh embodiment, the force for holding the decoration member can be always maintained. Therefore, the undesirable separation of the decoration can be prevented even if the decoration member is rotated.

FIGS. 39 and 40 illustrate an eighth embodiment of spectacles with a decoration according to the present invention. Referring to FIG. 39, reference numeral 801 represents a spectacle body which comprises a spectacle frame body 802 and a wire 805 for suspending the lens 804 from the rim portion 803 of the spectacle frame body 802, the wire 805 serving as a flexible lens holding member.

The wire 805, according to this embodiment, is made of nylon wire, or a metal wire, and is wound around the lens 804. The lens 804 has a groove 806 which receives the wire member 805. The two end portions of the wire 805 are secured to the rim portions 803 of the spectacle frame body 802 so that the lens 804 is strongly held by the spectacle frame body 802 by the tension of the wire 805.

The wire 805 has a support member 807 for fastening a decoration 808 in such a manner that the decoration 808 is able to be attached and detached to and from the support member 807. The decoration 808 comprises a decoration member 808a.

The support member 807 comprises a base portion 809 secured to the wire 805 and a support member body 810 projecting over the base portion 809 in the side direction.

The base portion 809 is a cylindrical member through which the wire 805 is able to pass, the base portion 809 being secured to the wire 805. The base portion 809 may be fixed by only the tension of the wire 805 which presses the base portion 809 to the outer surface of the lens 804. As an alternative to this, it may be secured to the wire 805 by press fixing or adhesion regardless of the lens 804. Furthermore, the base portion 809 may be integrally formed with the wire 805.

The support member body 810 is also a cylindrical member similar to the base portion 809. According to this embodiment, they are formed in the same shape and each has a through hole 811 formed vertically.

On the other hand, a variety of members may be used as the decoration member 808a but they have a common attachment 812 which can be attached and detached to and from the support member body 810. The attachment 812 is a cylindrical member having an opening at the lower end thereof and, as well, having a cut portion 813 in the side wall thereof, the cut portion 813 extending to reach the lower end of the attachment 812. Furthermore, the attachment 812 includes a pin 815 which can be inserted into the through hole 811 of the support member body 810 and which projects downwards. Although the shape of the attachment 812 has the opening in only the lower portion thereof, as illustrated, the top end portion may be opened. As an alternative to this, both the top and lower end portions may be opened.

Since the eighth embodiment is arranged in such a manner that the decoration 808 is made detachable to the support member 807, the decoration 804 can be attached or detached while eliminating a necessity of removing the lens 804. That is, the lower opening portion of the attachment 812 of the decoration 808 is used to cover the top end portion of the support member body 810 and it is inserted downwards while using the outer surface of the support member body 810 and the pin 815 as guides.

When the decoration 808 is fixed, only the lower end portion of the side wall, or the overall body of the attachment, is fixed under pressure. The decoration 808 can be removed by upwards drawing out the attachment 812 from the support member body 810.

In the case where the fastening portion and the attachment are made of an NT shape memory alloy, or the like, and the shape before the press fixing is performed is stored, the decoration can easily be attached, or detached, even if the wire member is broken after the press fixing has been performed.

Since the decoration 808 can be easily replaced as described above, the result of the change of the decoration 808 can easily be confirmed and an excellent advantage can be obtained when a demonstration is performed.

FIG. 40 illustrates a second aspect of the eighth embodiment. The second aspect is different from the first aspect in that the through hole 811 is omitted from the support member body 810 and also the pin 815 is omitted from the inside portion of the attachment 812. The other structures are substantially the same as those of the first aspect and therefore their descriptions are omitted here.

FIG. 40E illustrates a third aspect of the eighth embodiment of the present invention.

Referring to FIG. 40E, a support member 827 comprises a base portion 829 secured to the wire 805 and a hook 830 projecting over the base portion 829. The hook 830 is formed into a substantially L-shape and has an end portion secured to the base portion 829 and another end portion extending upwards.

The decoration 808 has a fastening hole 831 which is able to receive the hook 830 of the support member 827. Referring to FIG. 40E, the fastening hole 831 is formed in a cylindrical attachment 832 fastened to the reverse side of the decoration 808.

As described above, the eighth embodiment has the support member provided for the lens holding member for the purpose of fastening the decoration. Therefore, the decoration can easily be fastened while eliminating the necessity of removing the lens.

Furthermore, the decoration may be fixed to the support member by press fixing, or the like, after the decoration has been fastened to the support member.

In addition, by making the decoration to be detachable, the result of the change of the decoration can easily be confirmed and an excellent advantage can be achieved when a demonstration is performed.

FIGS. 41 to 48 represent a ninth embodiment of spectacles with a decoration according to the present invention.

In the ninth embodiment, the decoration is fastened to an end portion of a wire 904 as a lens holding member which is to be fastened to the body of the spectacle frame such as a rim 905. Particularly, as shown in FIGS. 41 to 46, according to this embodiment, the end portion of the wire 904 can be covered or concealed by the decoration 906, thus improving the merit on design. The end portion of the wire 904 may be secured through the decoration 906 as shown in FIGS. 45 to 48.

Although the invention has been described in its preferred form with a certain degree of particularly, it is understood that the present disclosure of the preferred form has been changed in the details of construction and the combination and arrangement of parts may be resorted to without departing from the scope of the invention as hereinafter claimed.

What is claimed is:

1. Spectacles with a decoration, comprising
   a pair of lenses;
   spectacle frame bodies;
   flexible lens holding members arranged around said lenses for holding said lenses within said spectacle frame bodies; and a decoration fastened to at least one of said flexible lens holding members, said decoration having fitting means for being fitted to said flexible lens holding member, wherein said decoration is fitted to the flexible lens holding member through a fastening hole through which said lens holding member is fastened.

2. Spectacles with a decoration according to claim 1, wherein said decoration is fitted to said flexible lens holding member by a fastening pipe through which said flexible lens holder member is fastened.

3. Spectacles with a decoration according to claim 1 wherein said decoration is fitted by a fastening piece engaged with said flexible lens holding member.

4. Spectacles with a decoration, comprising
   a pair of lenses;
   spectacle frame bodies;
   flexible lens holding members arranged around said lenses for holding said lenses within said spectacle frame bodies; and a decoration fastened to at least one of said flexible lens holding members, said decoration being fastened to said flexible lens holding member by adjustment means for adjustment of said decoration along said lens holding member, wherein said decoration is fitted to the flexible lens holding member through a fastening hole through which said lens holding member is fastened.

5. Spectacles with a decoration according to claim 4, wherein said decoration is fitted to said flexible lens holding member by a fastening pipe through which said flexible lens holder member is fastened.

6. Spectacles with a decoration according to claim 4 wherein said decoration is fitted by a fastening piece engaged with said flexible lens holding member.

* * * * *